United States Patent
Shivarudraiah

(10) Patent No.: US 12,248,476 B2
(45) Date of Patent: *Mar. 11, 2025

(54) SYSTEM AND METHOD FOR DYNAMIC DATABASE SPLIT GENERATION IN A MASSIVELY PARALLEL OR DISTRIBUTED DATABASE ENVIRONMENT

(71) Applicant: ORACLE INTERNATIONAL CORPORATION, Redwood Shores, CA (US)

(72) Inventor: Ashok Shivarudraiah, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,568

(22) Filed: Dec. 29, 2023

(65) Prior Publication Data

US 2024/0134861 A1    Apr. 25, 2024

Related U.S. Application Data

(63) Continuation of application No. 16/502,727, filed on Jul. 3, 2019, now Pat. No. 11,899,666, which is a
(Continued)

(51) Int. Cl.
*G06F 16/24* (2019.01)
*G06F 16/2455* (2019.01)
*G06F 16/27* (2019.01)

(52) U.S. Cl.
CPC ...... *G06F 16/24554* (2019.01); *G06F 16/278* (2019.01)

(58) Field of Classification Search
CPC .......................... G06F 16/24554; G06F 16/278
See application file for complete search history.

(56) References Cited

U.S. PATENT DOCUMENTS

| 5,864,840 A | 1/1999 | Leung |
| 5,878,409 A | 3/1999 | Baru |

(Continued)

FOREIGN PATENT DOCUMENTS

WO    2015152868    10/2015

OTHER PUBLICATIONS

United States Patent and Trademark Office, Office Communication mailed Feb. 7, 2018 for U.S. Appl. No. 14/864,788, 29 pages.

(Continued)

*Primary Examiner* — Etienne P Leroux
*Assistant Examiner* — Cindy Nguyen
(74) *Attorney, Agent, or Firm* — TUCKER ELLIS LLP

(57) ABSTRACT

A system and method is described for database split generation in a massively parallel or other distributed database environment including a plurality of databases and a data warehouse layer providing data summarization and querying functionality. A database table accessor of the system obtains, from an associated client application, a query for data in a table of the data warehouse layer, wherein the query includes a user preference. The system obtains table data representative of properties of the table, and determines a splits generator in accordance with one or more of the user preference or the properties of the table. The system generates, by the selected splits generator, table splits dividing the user query into a plurality of query splits, and outputs the plurality of query splits to an associated plurality of mappers for execution by the associated plurality of mappers of each of the plurality of query splits against the table.

20 Claims, 18 Drawing Sheets

Related U.S. Application Data continuation of application No. 14/864,765, filed on Sep. 24, 2015, now Pat. No. 10,394,818.

(60) Provisional application No. 62/056,400, filed on Sep. 26, 2014.

(56) References Cited

U.S. PATENT DOCUMENTS

| | | |
|---|---|---|
| 6,681,218 B1 | 1/2004 | Zou |
| 6,748,377 B1 | 6/2004 | Attaluri |
| 6,959,373 B2 | 10/2005 | Testardi |
| 7,177,855 B2 | 2/2007 | Witkowski |
| 7,337,163 B1 | 2/2008 | Srinivasan |
| 7,647,354 B2 | 1/2010 | Norcott |
| 7,716,173 B2 | 5/2010 | Stolte |
| 7,756,889 B2 | 7/2010 | Yu |
| 7,818,349 B2 | 10/2010 | Frost |
| 7,895,186 B2 | 2/2011 | Yu |
| 7,930,294 B2 | 4/2011 | Shuf |
| 7,930,297 B2 | 4/2011 | Yu |
| 7,979,425 B2 | 7/2011 | Garg |
| 8,244,715 B2 | 8/2012 | Cole |
| 8,326,821 B2 | 12/2012 | Andrade |
| 8,341,120 B2 | 12/2012 | Barton |
| 8,380,702 B2 | 2/2013 | Baby |
| 8,386,508 B2 | 2/2013 | Krishnamoorthy |
| 8,392,482 B1 | 3/2013 | McAlister |
| 8,510,263 B2 | 8/2013 | Essawi |
| 8,533,181 B2 | 9/2013 | Hu |
| 8,539,504 B2 | 9/2013 | Bidelis |
| 8,589,357 B2 | 11/2013 | Radhakrishnan |
| 8,589,361 B2 | 11/2013 | Hu |
| 8,601,000 B1 * | 12/2013 | Stefani ............ G06F 16/278 707/812 |
| 8,631,028 B1 | 1/2014 | Pettovello |
| 8,725,882 B2 | 5/2014 | Neel |
| 8,793,287 B2 | 7/2014 | Peh |
| 8,799,284 B2 | 8/2014 | Jagtiani |
| 8,825,629 B2 | 9/2014 | Lawande |
| 8,838,919 B2 | 9/2014 | Shi |
| 8,856,083 B2 | 10/2014 | Ganesh |
| 8,874,600 B2 | 10/2014 | Gupta |
| 8,880,565 B2 | 11/2014 | Fricke |
| 8,886,631 B2 | 11/2014 | Abadi |
| 8,892,599 B2 | 11/2014 | Lindblad |
| 8,893,131 B2 | 11/2014 | Ramakrishnan |
| 8,918,388 B1 | 12/2014 | Chen |
| 8,924,426 B2 | 12/2014 | Chattopadhyay |
| 8,996,464 B2 | 3/2015 | Zhou |
| 9,015,114 B2 | 4/2015 | Chatterjee |
| 9,015,197 B2 | 4/2015 | Richards |
| 9,146,959 B2 | 9/2015 | Chen |
| 9,218,379 B2 | 12/2015 | Grondin |
| 9,229,982 B2 | 1/2016 | Cras |
| 9,239,741 B2 | 1/2016 | Dai |
| 9,256,639 B2 | 2/2016 | Shironoshita |
| 9,348,641 B2 | 5/2016 | Mupparti |
| 9,400,815 B2 | 7/2016 | Poppitz |
| 9,442,994 B2 | 9/2016 | Carvalho |
| 9,460,186 B2 | 10/2016 | Liu |
| 9,489,443 B1 | 11/2016 | Muniswamy-Reddy |
| 9,495,296 B2 | 11/2016 | Subramanyam |
| 9,495,427 B2 | 11/2016 | Abadi |
| 9,501,483 B2 | 11/2016 | Srivas |
| 9,575,966 B2 | 2/2017 | Goyal |
| 9,576,000 B2 | 2/2017 | Balmin |
| 9,600,513 B2 | 3/2017 | Bourbonnais |
| 9,607,042 B2 | 3/2017 | Long |
| 9,652,496 B1 | 5/2017 | Antova |
| 9,659,039 B2 | 5/2017 | Ziauddin |
| 9,684,874 B2 | 6/2017 | Cichosz |
| 9,697,476 B1 | 7/2017 | Prieditis |
| 9,747,335 B2 | 8/2017 | Lee |
| 9,910,860 B2 | 3/2018 | Eltabakh |
| 9,922,088 B2 | 3/2018 | Nica |
| 9,965,497 B2 | 5/2018 | Raghavan |
| 10,007,698 B2 | 6/2018 | Delafranier |
| 10,055,509 B2 | 8/2018 | Hong |
| 10,078,684 B2 | 9/2018 | Shivarudraiah |
| 10,089,357 B2 | 10/2018 | Shivarudraiah |
| 10,089,377 B2 | 10/2018 | Shivarudraiah |
| 10,180,973 B2 | 1/2019 | Shivarudraiah |
| 10,248,685 B2 | 4/2019 | Kulkarni |
| 10,248,691 B2 | 4/2019 | Das |
| 10,303,682 B2 | 5/2019 | Macnicol |
| 10,360,269 B2 | 7/2019 | Baby |
| 10,380,114 B2 | 8/2019 | Shivarudraiah |
| 10,387,421 B2 | 8/2019 | Shivarudraiah |
| 10,394,818 B2 | 8/2019 | Shivarudraiah |
| 10,528,596 B2 | 1/2020 | Shivarudraiah |
| 11,544,268 B2 | 1/2023 | Shivarudraiah |
| 11,899,666 B2 | 2/2024 | Shivarudraiah |
| 2004/0186832 A1 | 9/2004 | Jardin |
| 2005/0131893 A1 | 6/2005 | Von Glan |
| 2007/0043751 A1 | 2/2007 | Chen |
| 2007/0226176 A1 | 9/2007 | Bestgen |
| 2007/0288529 A1 | 12/2007 | Ganesh |
| 2010/0235606 A1 | 9/2010 | Oreland |
| 2012/0239688 A1 | 9/2012 | Yanase |
| 2012/0310916 A1 | 12/2012 | Abadi |
| 2013/0205028 A1 | 8/2013 | Crockett |
| 2013/0275367 A1 | 10/2013 | Shuma |
| 2014/0012817 A1 | 1/2014 | Kim |
| 2014/0280019 A1 | 9/2014 | Elias |
| 2014/0379691 A1 | 12/2014 | Teletia |
| 2015/0149413 A1 * | 5/2015 | Lee ............ G06F 16/2386 707/643 |
| 2015/0317345 A1 | 11/2015 | Liu |
| 2015/0379077 A1 | 12/2015 | Grosse |
| 2016/0092543 A1 | 3/2016 | Shivarudraiah |
| 2016/0092544 A1 | 3/2016 | Shivarudraiah |
| 2016/0092548 A1 | 3/2016 | Shivarudraiah |
| 2016/0342653 A1 | 11/2016 | Chen |
| 2017/0116278 A1 | 4/2017 | Baby |
| 2017/0116334 A1 | 4/2017 | Kruglikov |
| 2018/0081922 A1 | 3/2018 | Brown |
| 2018/0253463 A1 | 9/2018 | Bastawala |
| 2019/0163545 A1 | 5/2019 | Singh |
| 2019/0171763 A1 | 6/2019 | Cai |
| 2019/0238653 A1 | 8/2019 | Syomichev |
| 2019/0324967 A1 | 10/2019 | Shivarudraiah |

OTHER PUBLICATIONS

United States Patent and Trademark Office, Office Communication mailed Sep. 25, 2017 for U.S. Appl. No. 14/864,773, 20 pages.

United States Patent and Trademark Office, Office Communication mailed Sep. 21, 2017 for U.S. Appl. No. 14/864,782, 26 pages.

United States Patent and Trademark Office, Office Communication mailed Nov. 2, 2017 for U.S. Appl. No. 14/864,776, 13 pages.

United States Patent and Trademark Office, Office Communication dated Nov. 2, 2017 for U.S. Appl. No. 14/864,785, 26 pages.

United States Patent and Trademark Office, Office Communication dated Oct. 5, 2018 for U.S. Appl. No. 14/864,765 , 17 pages.

United States Patent and Trademark Office, Notice of Allowance and Fee(s) Due dated Apr. 8, 2019 for U.S. Appl. No. 14/864,765, 20 pages.

United States Patent and Trademark Office, Office Communication dated Oct. 4, 2018 for U.S. Appl. No. 14/864,769 , 15 pages.

United States Patent and Trademark Office, Notice of Allowance and Fee(s) Due dated Apr. 8, 2019 for U.S. Appl. No. 14/864,769, 21 pages.

United States Patent and Trademark Office, Office Communication dated May 26, 2022 for U.S. Appl. No. 16/502,720 , 26 pages.

United States Patent and Trademark Office, Notice of Allowance and Fee(s) Due dated Oct. 6, 2022 for U.S. Appl. No. 16/502,720, 12 pages.

United States Patent and Trademark Office, Office Communication dated Jul. 27, 2018 for U.S. Appl. No. 14/864,773 , 8 pages.

(56) References Cited

OTHER PUBLICATIONS

United States Patent and Trademark Office, Notice of Allowance and Fee(s) Due dated Mar. 27, 2019 for U.S. Appl. No. 14/864,773, 8 pages.
United States Patent and Trademark Office, Notice of Allowance and Fee(s) Due dated May 31, 2018 for U.S. Appl. No. 14/864,776, 21 pages.
United States Patent and Trademark Office, Notice of Allowance and Fee(s) Due dated May 31, 2018 for U.S. Appl. No. 14/864,782, 23 pages.
United States Patent and Trademark Office, Notice of Allowance and Fee(s) Due dated May 22, 2018 for U.S. Appl. No. 14/864,785, 25 pages.
United States Patent and Trademark Office, Notice of Allowance and Fee(s) Due dated Sep. 6, 2018 for U.S. Appl. No. 14/864,788, 6 pages.
United States Patent and Trademark Office, Office Communication dated Nov. 1, 2018 for U.S. Appl. No. 14/864,792 , 33 pages.
United States Patent and Trademark Office, Office Communication dated May 22, 2019 for U.S. Appl. No. 14/864,792 , 38 pages.
United States Patent and Trademark Office, Notice of Allowance and Fee(s) Due dated Aug. 26, 2019 for U.S. Appl. No. 14/864,792, 13 pages.
United States Patent and Trademark Office, Notice of Allowance and Fee(s) Due dated Sep. 29, 2023 for U.S. Appl. No. 16/502,727, 8 pages.
United States Patent and Trademark Office, Office Communication dated Mar. 14, 2023 for U.S. Appl. No. 16/502,727 , 34 pages.
United States Patent and Trademark Office, Office Communication dated Sep. 13, 2022 for U.S. Appl. No. 16/502,727 , 23 pages.
United States Patent and Trademark Office, Office Communication dated Apr. 11, 2022 for U.S. Appl. No. 16/502,727 , 27 pages.
Balmin, A et al., "A platform for extreme Analytics", © 2013 IBM, IBM Journal of Research and Development vol. 57, No. 3/4 Paper 4, May/Jul. 2013, 11 pages.

\* cited by examiner

SYSTEM AND METHOD FOR DYNAMIC DATABASE SPLIT GENERATION IN A MASSIVELY PARALLEL OR DISTRIBUTED DATABASE ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application is a continuation of U.S. Patent Application titled "SYSTEM AND METHOD FOR DYNAMIC DATABASE SPLIT GENERATION IN A MASSIVELY PARALLEL OR DISTRIBUTED DATABASE ENVIRONMENT", application Ser. No. 16/502,727, filed on Jul. 3, 2019; which is a continuation of U.S. Patent Application titled "SYSTEM AND METHOD FOR DYNAMIC DATABASE SPLIT GENERATION IN A MASSIVELY PARALLEL OR DISTRIBUTED DATABASE ENVIRONMENT", application Ser. No. 14/864,765, filed on Sep. 24, 2015, and subsequently issued as U.S. Pat. No. 10,394,818 on Aug. 27, 2019; which claims the benefit of priority to U.S. Provisional Patent Application titled "SYSTEM AND METHOD FOR DYNAMIC DATABASE SPLIT GENERATION IN A PARALLEL ENVIRONMENT", Application No. 62/056,400, filed on Sep. 26, 2014; each of which above applications and the contents thereof are herein incorporated by reference.

FIELD OF INVENTION

The embodiments described herein are generally related to data processing, and are particularly related to systems and methods for database split generation in massively parallel or other distributed database environments.

BACKGROUND

Data processing frameworks are available for distributed storage and processing of large sets of data on commodity hardware. One such data processing framework is Apache Hadoop™ which is an open source framework for distributed storage and processing of large sets of data on commodity hardware. The Hadoop framework can be used to process large amounts of data in a massively parallel or other distributed manner thereby enabling businesses to quickly gain insight from massive amounts of both structured as well as unstructured data.

The Hadoop framework is enterprise ready in part because it provides for the storage and processing of vast quantities of data in a storage layer that scales linearly. In this regard, Hadoop Distributed File System (HDFS) is a technology providing for efficient scale out of a storage layer. Environments such as HDFS provide a fault-tolerant environment which is designed to be deployed within a distributed computing infrastructure, using relatively low-cost commodity hardware. Such an environment provides high throughput access to application data, and is particularly suitable for applications that have very large data sets (e.g., machine learning).

Many specialized engines are available for enabling interaction with the data in a wide variety of ways including batch access, real-time access, and combinations of batch and real-time access. Apache Hive™ is the most widely adopted technology for accessing massive amounts of data such as might be organized and stored in Hadoop and is, essentially, a data warehouse having tables similar to tables in a relational database. Engines such as Hive enable easy data summarization and ad-hoc/interactive queries via a structured query language (SQL) like interface for large datasets (e.g., petabytes of data) stored in HDFS.

Table and storage management interface layers such as the HCatalog interface enable users with different data processing tools to more easily read and write data relative to the Hadoop environment. HCatalog uses Hive's command line interface for issuing commands to define data and to explore metadata.

Latency for Hive queries, however, is generally very high even for relatively small data sets owing in part to the batch processing of Hadoop jobs which can at times incur substantial overheads in job submission and scheduling. In addition, tools such as HIVE that use a database abstraction layer such as HCatalog can divide a query into multiple pieces and execute them separately against a database. However, these queries are not executed atomically but instead are executed at different points in time. As such, the results of each query when combined could violate the read-consistent rule relative to database retrieval protocol rules.

SUMMARY

In accordance with an embodiment, described herein is a system and method for database split generation in a massively parallel or other distributed database environment including a plurality of databases and a data warehouse layer providing data summarization and querying of the plurality of databases. In an example embodiment, the system includes one or more microprocessors and a database table accessor running on the one or more microprocessors. The database table accessor operates to obtain, from an associated client application, a query for data in a table of the data warehouse layer, wherein the query comprises query data representative of a user query and user preference data representative of a user preference. The database table accessor further operates to obtain table data representative of one or more properties of the table, and to determine a splits generator in accordance with one or more of the user preference or the one or more properties of the table. The database table accessor operates to generate, by the selected splits generator, table splits dividing the user query into a plurality of query splits, and to output the plurality of query splits to an associated plurality of mappers for execution by the associated plurality of mappers of each of the plurality of query splits against the table. The table splits may be one or more of partition-based splits, size-based splits, ROWID-based splits or others as may be necessary or desired.

In accordance with a further embodiment, described herein is a system and method for database split generation and consistent reads in an associated massively parallel or other distributed database environment including a plurality of databases and a data warehouse layer providing data summarization and querying of the plurality of databases. In an example embodiment, the system includes one or more microprocessors and a database table accessor running on the one or more microprocessors. The database table accessor operates to obtain, from an associated client application, a query for data in a table of the data warehouse layer, wherein the query comprises query data representative of a user query and user preference data representative of a user preference. The database table accessor further operates to obtain table data representative of one or more properties of the table, and to determine a splits generator in accordance with one or more of the user preference or the one or more properties of the table. The database table accessor further operates to obtain, from the data warehouse layer, record current system change number (SCN) data, the SCN data being representative of a logical internal time stamp used by the plurality of databases of the associated massively parallel or other distributed database environment. The database table accessor operates to generate, by the selected splits generator, table splits dividing the user query into a plurality of query splits, to associate the SCN data with each of the plurality of query splits, and to output the plurality of query splits together with the SCN data to a plurality of associated mappers for execution by the plurality of mappers against the table as query tasks using the SCN data to provide consistent reads between the query tasks.

In accordance with a further embodiment, described herein is a system and method for high-speed data transfer from JDBC to a data warehouse layer as will be shown and described below.

In accordance with a further embodiment, described herein is a system and method for query processing with table-level predicate pushdown as will be shown and described below.

In accordance with a further embodiment, described herein is a system and method for efficient connection management in a distributed database environment as will be shown and described below.

DETAILED DESCRIPTION

Figure 1:
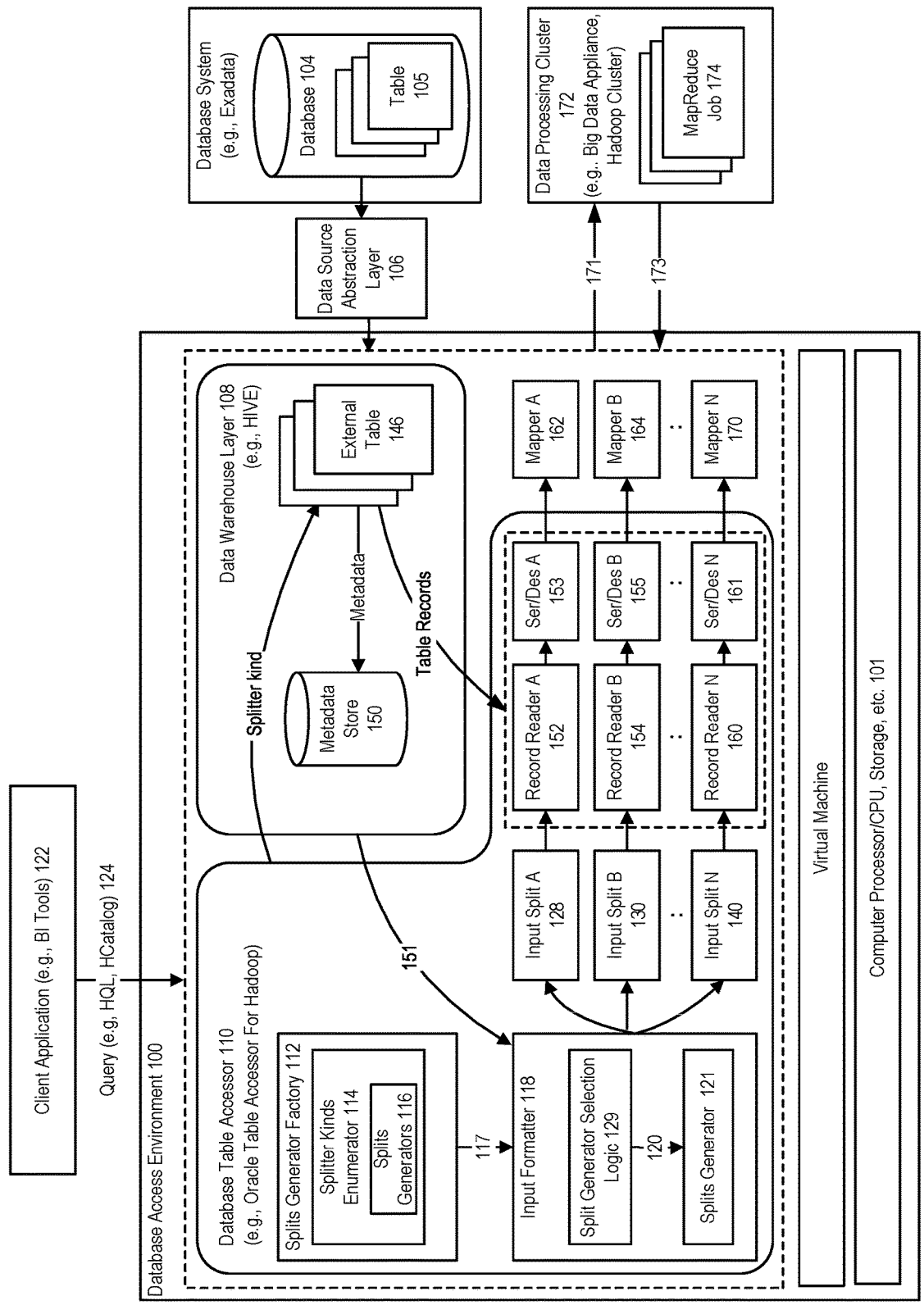
FIG. 1 illustrates a system for dynamically generating input splits based on table properties and/or user preferences for use in a massively parallel or other distributed environment, in accordance with an embodiment.

In accordance with an embodiment, described herein is a system and method for database split generation in a massively parallel or other distributed database environment including a plurality of databases and a data warehouse layer providing data summarization and querying of the plurality of databases.

In accordance with an embodiment, a data processing infrastructure, such as Hadoop, can include components that are central to effectively dealing with petabyte-scale problems: a distributed file system to provide fault-tolerant storage while scaling horizontally, and a parallel processing framework that can break processing jobs into tasks and distribute the tasks across a data processing cluster, or a massively parallel or other distributed environment.

In accordance with an embodiment, a data processing job can include several types of tasks including: a map task that filters and interprets input data to produce key-value pairs; and a reduce task that summarizes and aggregates the map results to produce final outputs.

To better define data processing jobs in a data processing framework, a plurality of application program interfaces (APIs) have been developed to allow users and developers to express their data processing jobs in the language they deem most suitable. As an illustrative example, Hive is a data warehouse system that provides such an API, wherein the API can be used to facilitate querying and managing large datasets using an SQL-like language called HiveQL™, wherein the datasets can either reside in a Hadoop distributed file system or any other equivalent different system.

In accordance with an embodiment, when data to be queried is stored in a relationship table, such as an Oracle™ database table, and particularly when the table is large, a query is broken into multiple query splits for use by the massively parallel or other distributed environment.

In accordance with an embodiment, described herein is a system and method for database split generation in a massively parallel or other distributed database environment including a plurality of databases and a data warehouse layer providing data summarization and querying of the plurality of databases.

Dynamic Database Split Generation

In accordance with an embodiment, described herein is a system and method for strategically and dynamically generating input splits based on table properties and user preferences for use in a massively parallel or other distributed environment including a plurality of databases and a data warehouse layer providing data summarization and querying of the plurality of databases.

In accordance with an embodiment, the system includes a database table accessor and a data warehouse layer, where the database table accessor, upon receiving a query for data in a table, can select a splits generator based on properties of the table and user preferences, to generate table splits and split the query into one or more query splits in accordance with the table splits. Each query split can then be executed against an external table created in the data warehouse layer to retrieve data from the table for processing.

In accordance with an embodiment, the database table accessor can include a splits generators component with an enumeration of splitter kinds indicating user hints, each splitter kind associated with a corresponding splits generator. In accordance with an embodiment, given a name of a splitter kind, the splits generators component can return an appropriate splits generator.

Additionally, the database table accessor can include an input format component responsible for generating query splits itself or invoking a splits generator to generate the query splits.

In accordance with an embodiment, the external table can be created at a user interface and managed by the database table accessor. Additionally, the external table can include a user-defined splitter kind as a property. In accordance with an embodiment, metadata of the external table can be stored in the data warehouse layer and used to access data in the database table.

In accordance with an embodiment, when creating table splits of a table, the table is logically split so that each split of the table can be accessed from a query level via an external tool such as, for example, HIVE or any other similar or equivalent technology tools for accessing massive amounts of data such as might be organized and stored in Hadoop enabling easy data summarization and ad-hoc/interactive queries via a SQL-like interface for large datasets (e.g., petabytes of data) stored in HDFS.

In accordance with an embodiment, a table can be split based on various splitter kinds, which indicate a user's preferences how the table should be split. In accordance with an embodiment, the splitter kinds can include splitting a table based on partitions, sizes, row limits and ROWID ranges. The database table accessor, when splitting a table, additionally takes considerations of properties of the table, and can strategically and dynamically split the table based on these properties As an illustrative example, the database table accessor may split a partitioned table differently, even with a user hint that the table be split based on a ROWID range. In accordance with an embodiment, splitting a partitioned table by a ROWID range could generate duplicate rows in two different splits, causing problems in the reduce/aggregation phase in a map reduce job.

In accordance with an embodiment, the database table accessor can use a strategy or heuristic to split a table based on a plurality of factors, including a user hint, the size of the table, whether the table is partitioned, whether splitting the table in a particular way can improve the overall performance of the system. For example, if a table is small, the database table accessor can take the whole table as a single split and provide the split to one map reduce job for processing.

In accordance with an embodiment, the above-described approach provides an architecture for dynamically generating query splits based on table properties and user hints, and for efficiently creating new split generators. In addition, the system is highly configurable with additional user preferences and associated splits generators to accommodate various requirements of users or client applications.

FIG. 1 illustrates a system for dynamically and strategically splitting a table based on one or more of properties of the table or user hints for a massively parallel or other distributed environment, in accordance with an embodiment.

As shown in FIG. 1, by way of example, the system can include an application server or database access environment 100; a physical computer processor/CPU and storage 101; a database table accessor (e.g., a database table accessor for Hadoop) 110; and a data warehouse layer (e.g., a HIVE component) 108; wherein the database access environment 100 can receive from a client application 122 a query 124 (e.g., a SQL query) for data in a table 105 in a database 104.

In accordance with an embodiment, the data requested from the table 105 can be passed 171 to a data processing cluster (e.g., a Hadoop cluster) 172 for processing by map reduce jobs, e.g., 174, distributed across the cluster. The aggregation outputs can then be returned 173 to the system for presentation to the client application 122.

As further shown in FIG. 1, the database table accessor 110 includes, in accordance with an embodiment herein, a splits generators component 112 and an input format component 118. In accordance with an embodiment, the splits generators component 112 includes a splitter kind enumerator object 114 that wraps a plurality of splitter kinds and a plurality of input splits generators 116, each of which is associated with a particular splitter kind. In accordance with an embodiment, a splitter kind is a user input specifying how a table should be split. In accordance with an embodiment, given the name of a splitter kind, the splits generators component can return a splits generator associated with the splitter kind. In accordance with another embodiment, given properties of the table object of the search query, the splits generators component can return a splits generator associated with a splitter kind selected in accordance with the table properties.

Listing 1, as shown below, illustrates an implementation of the splits generators component in accordance with an embodiment.

---
Listing 1
---

```
public enum SplitsGeneratorKind {
  /**
   * Generates one Split.
   */
  SIMPLE(new OracleSimpleSplitsGenerator( ) )
  private OracleSplitsGenerator generator;
  SplitsGeneratorKind(OracleSplitsGenerator value) { generator = value; }
  /**
   * Obtain an InputSplit generator for a given splitter kind.
   *
   * @return an instance of OracleSplitsGenerator
   */
  OracleSplitsGenerator getGenerator( ) { return generator; }
```
---

As shown in in Listing 1 above, in accordance with an embodiment, the splits generators component can return a simple splits generator for generating a single split, when the table includes a smaller number of rows; or an appropriate splits generator for a given splitter kind.

As further shown in FIG. 1, the input format component can be responsible for generating table splits based on properties of the table and/or user preferences, and generating query splits in accordance with the generated table splits. The input format component can generate query splits itself, or use 120 a splits generator 121 selected by a splits generator selection logic 129 to generate the query splits.

In accordance with an embodiment, the splits generator selection logic 129 can select a splits generator using a pre-defined strategy in combination with properties of a table and/or user preferences retrieved 151 from the data warehouse layer 108. In accordance with an embodiment, once a selection is made, the input format component can obtain 117 the selected splits generator from the splits generators component 112 using the corresponding splitter kind.

In accordance with embodiment, an example implementation of the input format component can be illustrated using pseudocode as shown in Listing 2:

---
Listing 2
---

```
fetchTableProperties( );
if TABLE_PARTITIONED then
  Use PartionedSplitsGenerator;
else if FULL_SELECT AND SPLIT_HINT = ROWID_RANGE then
  Use RowidRangeSplitsGenerator;
endif
InputSplits splits = splitsGenerator.getGenerator( ).getInputSplits(...);
```
---

As shown in Listing 2, when the input format component is invoked, properties of a database table are fetched and examined, and internal logic is used to select an appropriate splits generator based on user preferences (user "hints") and/or table properties. For example, if the database table is partitioned, the database table accessor 110 can select a partition-based splits generator; if a query is received for data in the table based on a user-defined size enabling the table to be split into multiple ranges for optimal processing, the database table accessor 110 can select a size-based splits generator; and if a query received is for selecting all rows in a table, and a user preference or hint received is to split the table by a ROWID range, the database table accessor 110 can select a ROWID range based splits generator. In accordance with an embodiment, a plurality of other types of splits generators can be chosen based on the table properties and the user preferences or hints and/or the table properties as may be necessary or desired. Once an appropriate splits generator is selected, it can be used to generate splits of the table, and to split the query into a plurality of query splits in accordance with the generated table splits.

In an accordance with an embodiment, each splits generator can implement a common interface, e.g., OracleSplitsGenerator, and can include a method, e.g., getInputSplits( ), which returns the InputSplits generated by the splits generator. Similarly, each query split can implement a common interface, e.g., OracleHiveSplit, which can include a getSqlStringToAppend( ) method and a getBinds( ) method, wherein the former method returns a split specific SQL query, i.e. a InputSplits, and the latter method returns binds specific to a InputSplits.

In accordance with an embodiment, the data warehouse layer 108, e.g., HIVE, can be an abstraction layer over the data processing cluster, and enable accessing the database 104 using SQL queries while keeping transaction models in a transaction. As shown in FIG. 1, the data warehouse layer 108 includes a metadata store 150 containing data including obtaining table data representative of one or more properties of the table 146 wherein a splits generator is determined in accordance with one or more of the user preference or the one or more properties of the table, where a user can execute commands or queries to interact with the database 104 via execution of the query splits resulting from the splits generator as determined.

In accordance with an embodiment, an external table 146 is selectively created in the data warehouse layer 108 using the database table accessor 110, where definitions of the external table stored in the metadata store 150 can be used to access data in the database table 105. In accordance with an embodiment, data of the database table 105 would not be deleted if the external table is dropped. In accordance with an embodiment, the columns of the external table 146 can be the same with those of the database table 105, but the types of a particular column can be different in the two tables 146, 105.

In accordance with an embodiment, a query can be executed against the external table 146 to retrieve data from the database table, i.e. 105. In accordance with an embodiment, the data warehouse layer 108 can access the database 104 via a data source abstraction component 106, e.g., HCatalog. The data source abstraction component 106 can present users with a relational view of data from various types of data sources (e.g., database or files) and ensure that users need not be concerned with where or in what format the data is stored.

In accordance with an embodiment, the database table accessor 110 can use a data definition language (DDL), e.g., HIVE DDL, to manage definitions in both the metadata store 150 and the database metadata simultaneously and consistently. In accordance with an embodiment, the database table accessor 110 can associate itself with the external table 146 using e.g., a STORED BY clause when the external table is created.

As an illustrative example, an external table can be created in the data warehouse layer 108 using a DDL syntax shown in Listing 3:

---
Listing 3
---

CREATE EXTERNAL TABLE sales_test (

-continued

Listing 3

```
    prod_id int,
    cust_name STRING,
    TIME_ID timestamp
) STORED BY 'oracle.hcat.osh.OracleStorageHandler'
TBLPROPERTIES (
    'oracle.jdbc.url' = 'jdbc:oracle:thin:@localhost:1521:orcl',
    'oracle.jdbc.username' = 'scott',
    'oracle.jdbc.password' = 'tiger',
    'oracle.hcat.osh.tableName' = 'sales_test',
    'oracle.hcat.osh.splitterKind' = 'ROWID_RANGE'
)
```

In accordance with an embodiment, in Listing 3, an external table "sales_test" is created with column names "prod_id", "cust_name" and "TIME_ID" and managed by a database table accessor "oracle.hcat.osh.OracleStorageHandler". Additionally, the external table includes a plurality of properties, such as the name of the database table and a user hint that the database table should be split by a ROWID range.

In accordance with an embodiment, the metadata of the external table is stored in the metadata store 150 in the data warehouse layer 108. When a select query is executed against the external table 146, the table metadata is used to connect to the database 104 to fetch data from a table based on selected criteria such as, for example, a ROWID_Range, and present the data in the data warehouse layer 108.

As further shown in FIG. 1, in accordance with an embodiment, information about each of the query splits generated by the input format component can be embedded into a separate input split object, e.g., 128, 130 or 140. Each input split object can spawn a separate a record reader, e.g., 152, 154 or 160, which executes the query split against the external table 146 to retrieve records from the database table 105. In accordance with an embodiment, each record reader can further spawn a separate mapper, e.g., 162, 164 or 170, and corresponding serializers/de-serializers 153, 155 or 161 to process the records retrieved by each of the plurality of query splits as they are executed individually. In accordance with an embodiment, each mapper 162, 164 or 170 can be part of a map-reduce jobs in the data processing cluster.

Figure 2:
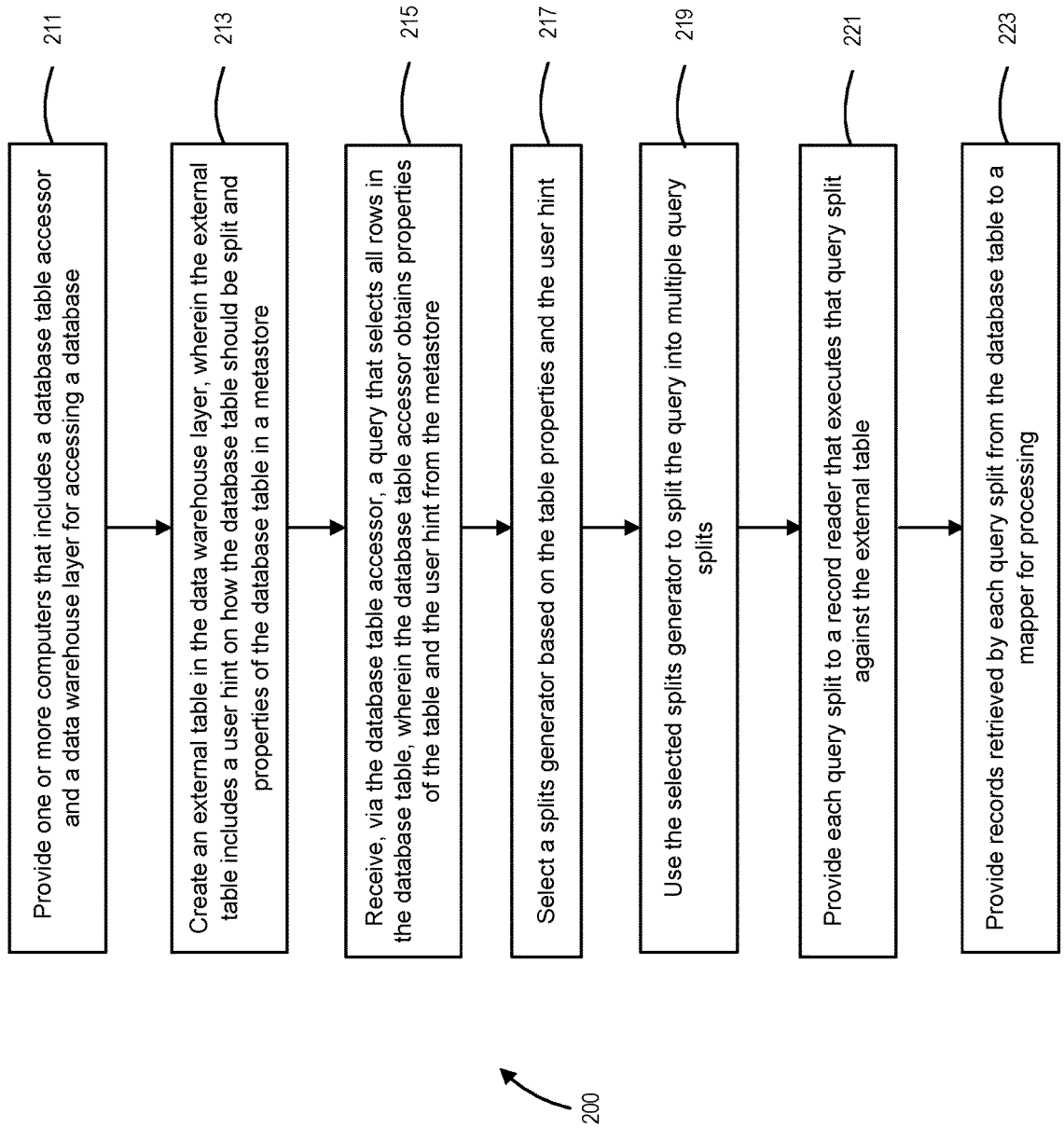
FIG. 2 is a flowchart that illustrates a method for dynamically generating input splits based on table properties and/or user preferences for use in a massively parallel or other distributed environment, in accordance with an embodiment.

FIG. 2 is a flowchart that illustrates a method 200 for dynamically generating input splits based on one or more of table properties or user preferences for use in a massively parallel or other distributed environment, in accordance with an embodiment.

As shown in FIG. 2 and with continued reference also to FIG. 1, in accordance with an embodiment, at step 211, one or more computers 101 (FIG. 1) including a database table accessor 110 and a data warehouse layer 108 for accessing a database 104 are provided.

At step 213, an external table 146 (FIG. 1) is created in the data warehouse layer 108 for a table 105 in a database 104, wherein the external table 146 is managed by the database table accessor 110 and includes one or more of user preferences or table properties on how the database table 105 should be split.

At step 215, the database table accessor 110 receives a query 124 that selects all rows in the HIVE/HCatalog table, and obtains properties of the table and the user preference.

At step 217, the database table accessor 110 selects a splits generator based on the table properties and the user preference.

At step 219, the database table accessor 110 uses the selected splits generator 121 to split the query into multiple query splits 128, 130, or 140.

At step 221, each query split is provided to a record reader 152, 154, or 160 that executes that query split against the external table 146.

At step 223, records from the database table 105 retrieved by each query split are provided to a mapper 162, 164, or 170 for processing by a data processing cluster.

Figure 3:
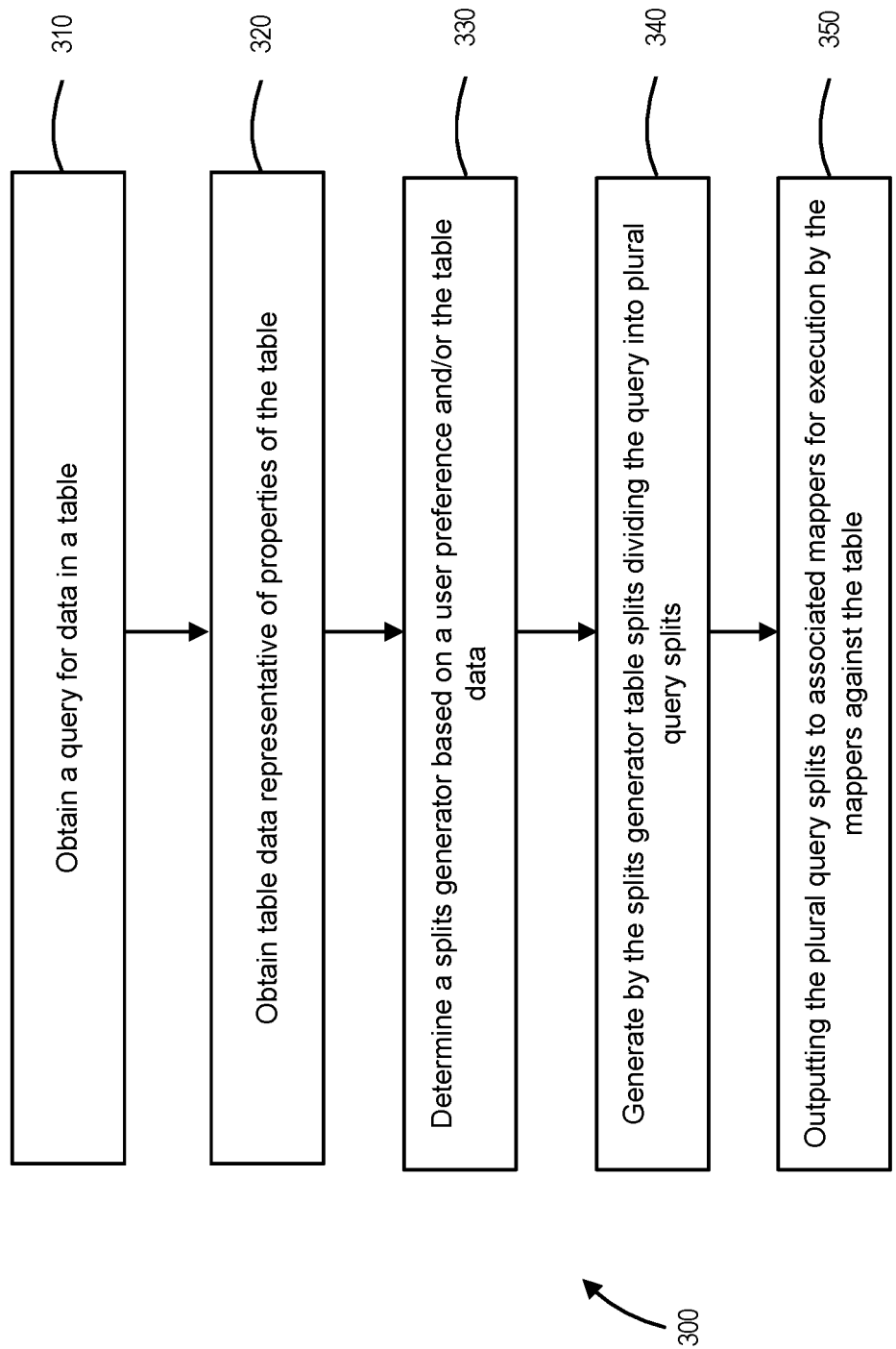
FIG. 3 is a flowchart that illustrates a method for dynamically generating input splits based on table properties and/or user preferences for use in a massively parallel or other distributed environment, in accordance with a further embodiment.

FIG. 3 is a flowchart that illustrates a method 300 in accordance with an example embodiment for dynamic database split generation in a massively parallel or other distributed database environment including a plurality of databases and a data warehouse layer providing data summarization and querying of the plurality of databases. As shown in FIG. 3 and with continued reference also to FIG. 1, in accordance with an embodiment, at step 310, the database table accessor 110 obtains, from an associated client application 122, a query 124 for data in a table of the data warehouse layer. In the example embodiment, the query 124 comprises query data representative of a user query and user preference data representative of a user preference.

At step 320, the database table accessor 110 obtains table data representative of one or more properties of the table and, at step 330 the database table accessor 110 determines a splits generator in accordance with one or more of the user preference or the one or more properties of the table.

At step 340 the database table accessor 110 generates, by the selected splits generator, table splits dividing the user query into a plurality of query splits.

At step 350 the database table accessor 110 outputs the plurality of query splits to an associated plurality of mappers 162, 164, or 170 for execution by the associated plurality of mappers of each of the plurality of query splits against the database table 105.

Consistent Reads Between Tasks

As noted above, overall, tools such as HIVE that use a database abstraction layer such as HCatalog can divide a query into multiple pieces and execute them separately against a database. However, these queries are not executed atomically but instead are executed at different points in time. As such, the results of each query when combined could violate the read-consistent rule relative to database retrieval protocol rules.

Accordingly, in accordance with a further embodiment, the system and method for dynamic database split generation in a massively parallel or other distributed database environment as described above also provides consistent reads between tasks using the efficient splits in a parallel data processing cluster. In accordance with an embodiment the database table accessor 110, before generating splits of the table dividing the user query into the plurality of query splits, can record the current system change number (SCN) in the database during or at the time of the splits generation, save the SCN as part of each generated query split, and during execution of the query splits using different tasks, use the SCN from each query split to achieve consistent reads between the tasks.

In accordance with an embodiment, an SCN is a database ordering primitive and represents a logical, internal time stamp used by a database, e.g., Oracle Database. SCNs order events that occur within the database, which is necessary to satisfy the atomicity, consistency, isolation, and durability (ACID) properties of a transaction that guarantee that database transactions are processed reliably. SCNs occur in a monotonically increasing sequence. An observed SCN indicates a logical point in time. If one event has a lower SCN than another event, then it occurred at an earlier time with respect to the database. Several events may share the same SCN, which means that they occurred at the same time with respect to the database. As such, an SCN can be used to exclude records added after the SCN was created if necessary or desired.

In accordance with an embodiment, the saved SCN can be checked for validity before it is set on a SQL statement for execution. The database table accessor 110 can check whether a generated split includes a SCN, or whether the saved SCN is in a valid format, or an object including the SCN is properly initialized. If the validity check fails on one or more query splits of the plurality of query splits, an error is indicated, and every query split is than executed anew.

Figure 4:
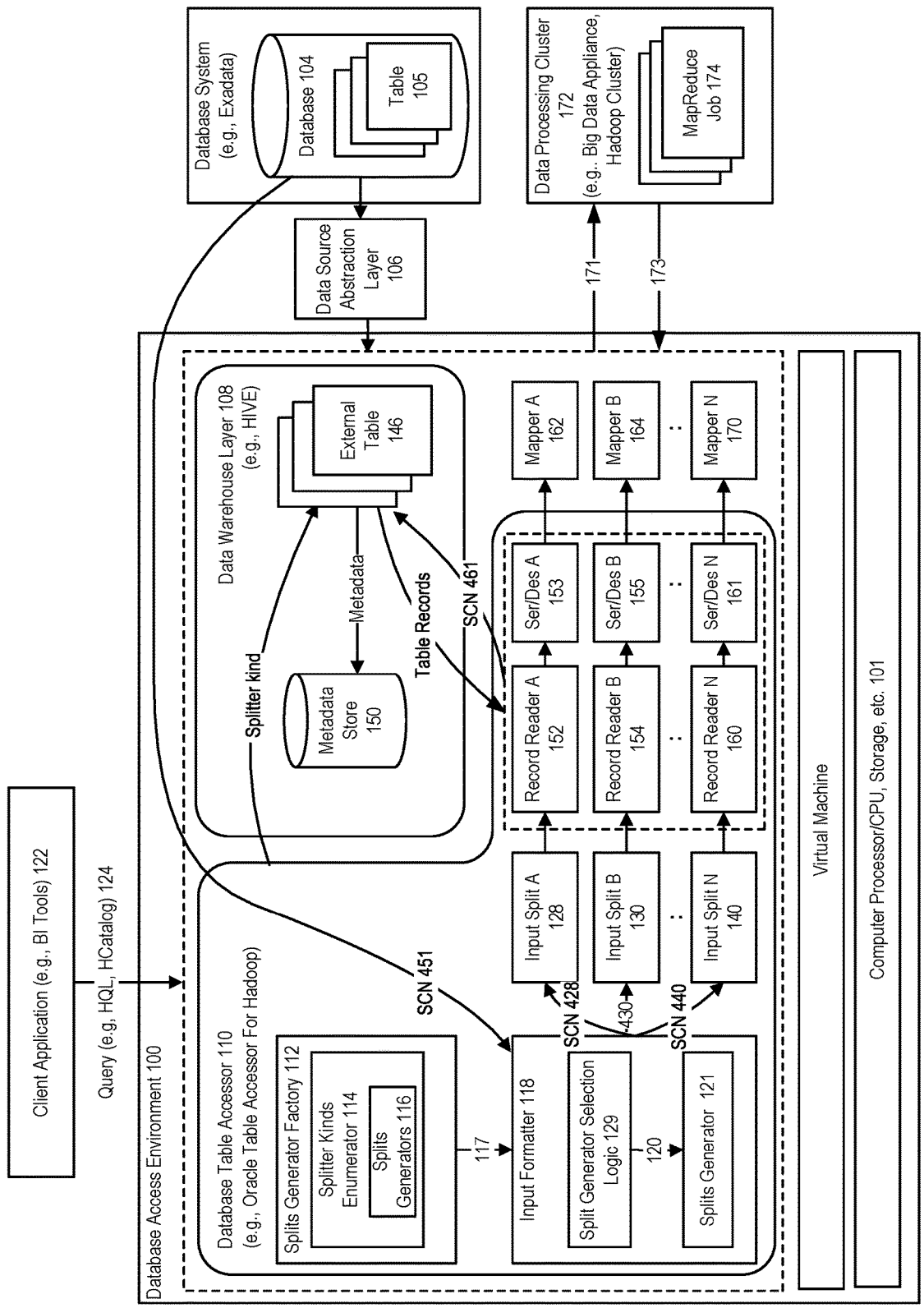
FIG. 4 illustrates a system for providing consistent reads between tasks using efficient splits in a parallel data processing system, in accordance with an embodiment.

FIG. 4 illustrates a system for providing consistent reads between tasks using efficient splits in a parallel data processing cluster, in accordance with an embodiment.

As illustrated in FIG. 4, before the input format component generates input splits, it can obtain 451 the current SCN from the database table and record the current SCN in the database table accessor 110. During input splits generation, the input format component can save the current SCN (e.g., SCN) 428, 430 and 440 as part of each generated query split 128, 130 or 140. During execution of the query splits, the SCN can be set on a SQL statement and be used 461 to achieve consistent reads across the different tasks.

The following pseudocode as shown in Listing 4 below illustrates an example implementation of the method for providing consistent reads between tasks using efficient splits in a parallel data processing cluster, in accordance with an embodiment.

---
Listing 4
---
```
// before generation of splits, record the SCN
long scn = oracleConnection:getCurrentSCN ( );
// during generation of splits, save SCN as a part of Split
InputSplit splits = new OracleHiveSplit(scn);
// during execution, use saved SCN from split during execution
long scn = oracleHiveSplit:getScn( );
IF scn NOT VALID THEN
   THROW EXCEPTION
ELSE
   SET SCN ON STATEMENT
ENDIF
```
---

Figure 5:
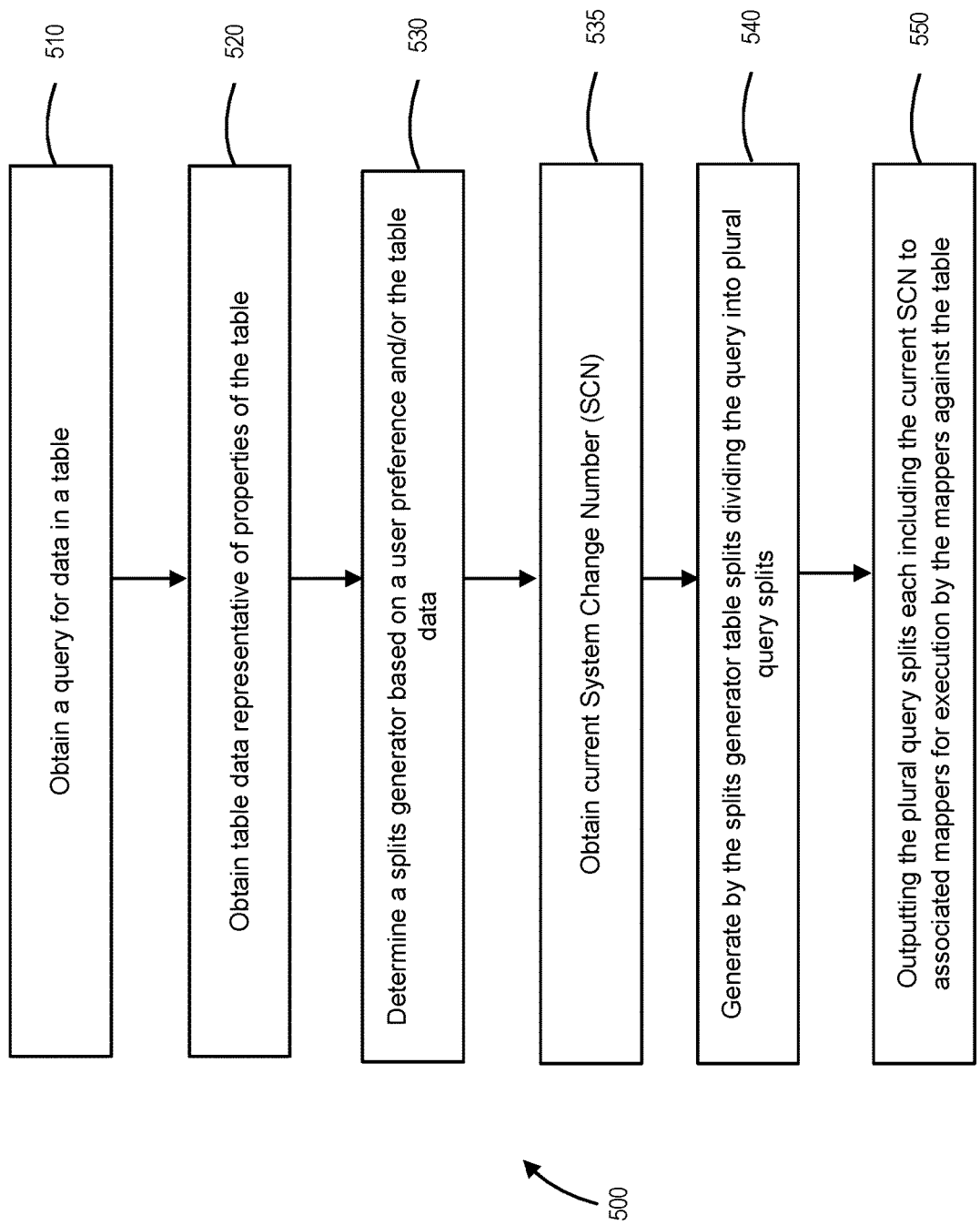
FIG. 5 is a flowchart that illustrates a method for providing consistent reads between tasks using efficient splits in a parallel data processing system, in accordance with an embodiment.

FIG. 5 is a flowchart that illustrates a method 500 in accordance with an example embodiment for dynamic database split generation in a massively parallel or other distributed database environment providing consistent reads between the plurality of query splits. As shown in FIG. 5 and with continued reference also to FIG. 1, in accordance with an embodiment, at step 510, the database table accessor 110 obtains, from an associated client application 122, a query 124 for data in a table of the data warehouse layer. In the example embodiment, the query 124 comprises query data representative of a user query and user preference data representative of a user preference.

At step 520, the database table accessor 110 obtains table data representative of one or more properties of the table and, at step 530 the database table accessor 110 determines a splits generator in accordance with one or more of the user preference or the one or more properties of the table.

At step 535 the current system change number is obtained.

At step 540 the database table accessor 110 generates, by the selected splits generator, table splits dividing the user query into a plurality of query splits.

At step 550 the database table accessor 110 outputs the plurality of query splits to the associated plurality of mappers 162, 164, or 170 for execution by the associated plurality of mappers of each of the plurality of query splits against the database table 105. In the embodiment each of the plurality of query splits sent to the associated plurality of mappers 162, 164, or 170 includes data representative of the current SCN.

Figure 6:
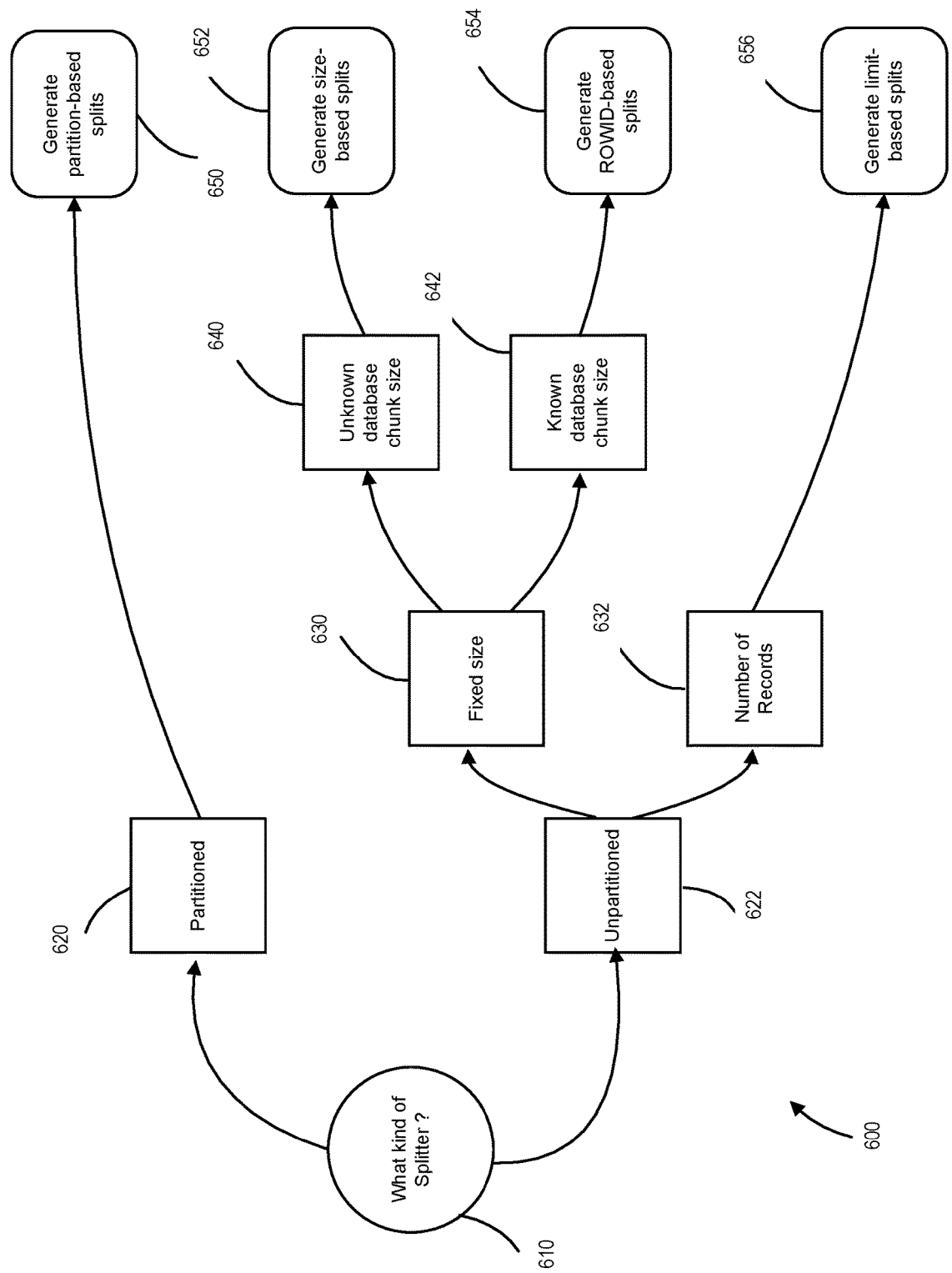
FIG. 6 is a functional control flowchart that illustrates a method for dynamically generating input splits based on table properties for use in a massively parallel or other distributed environment, in accordance with an embodiment.

FIG. 6 is a functional control flowchart that illustrates a method for dynamically generating input splits based on table properties for use in a massively parallel or other distributed environment, in accordance with an embodiment. With reference now to that Figure, the database table accessor 110 initiates a control function at control block 610 to determine a splitter kind using the split generator selection logic 129 (FIG. 1). By the split generator selection logic 129, the database table accessor 110 can determine from the metadata store 150 whether the data in the table is partitioned at control block 620 or whether the data in the table is unpartitioned at control block 622.

When it is determined at control block 620 that the data in the table is partitioned, the split generator selection logic 129 selects a partition-based splits protocol at control block 650 for generating a partition-based splits generator 121 (FIG. 1). Partition-based splits will be described below in detail with reference in particular to FIGS. 7 and 8.

With continued reference to FIG. 6, however, in accordance with an embodiment, when it is determined at control block 622 that the data in the table is unpartitioned, the database table accessor 110 initiates a control function at control block 630 to determine whether the data in the table is of a fixed size, and a control function at control block 640 when the table is not of a fixed size to determine a number of records in the table. When it is determined at control blocks 622, 632 that the data in the table is unpartitioned and not of a fixed size, the split generator selection logic 129 selects a limit-based splits protocol at control block 656 for generating a limit-based splits generator 121 (FIG. 1).

However, when it is determined at control blocks 622, 630 that the data in the table is unpartitioned and of a fixed size, the database table accessor 110 can determine from the metadata store 150 whether the data in the table is of an unknown database chunk size at control block 640 or whether the data in the table is of a known size at control block 642. When it is determined at control block 640 that the data in the table is of an unknown database chunk size, the split generator selection logic 129 selects a size-based splits protocol at control block 652 for generating a size-based splits generator 121 (FIG. 1). Size-based splits will be described below in detail with reference in particular to FIGS. 9 and 10. Similarly, when it is determined at control block 642 that the data in the table is of an known database chunk size, the split generator selection logic 129 selects a ROWID-based splits protocol at control block 654 for generating a ROWID-based splits generator 121 (FIG. 1). ROWID-based splits will be described below in detail with reference in particular to FIGS. 11 and 12.

Partition-Based Splits

In accordance with a further embodiment, a method for database partition-based split generation in an associated massively parallel or other distributed database environment including a plurality of databases and a data warehouse layer providing data summarization and querying of the plurality of databases is provided. A query for data in a table of the data warehouse layer is obtained from an associated client application, the query comprising query data representative of a user query and user preference data representative of a user preference. The method further includes obtaining, from the data warehouse layer, table data representative of one or more properties of the table, wherein the table data comprises partition data representative of a partition scheme of the table as having a partitioned topology wherein the table is logically divided into one or more partitions or an un-partitioned topology wherein the table is logically undivided. The method further includes selecting a partition-based splits generator in accordance with one or more of the query data indicating a user preference for a partition-based splits generator or the partition data indicating the partition scheme of the table as having the partitioned topology, and generating, by the selected partition-based splits generator, one or more table splits for each of the one or more partitions of the table, the one or more table splits dividing the user query into a plurality of query splits. The method further includes outputting the plurality of query splits to a plurality of associated mappers for execution by the plurality of associated mappers of each of the plurality of query tasks against the table.

Figure 7:
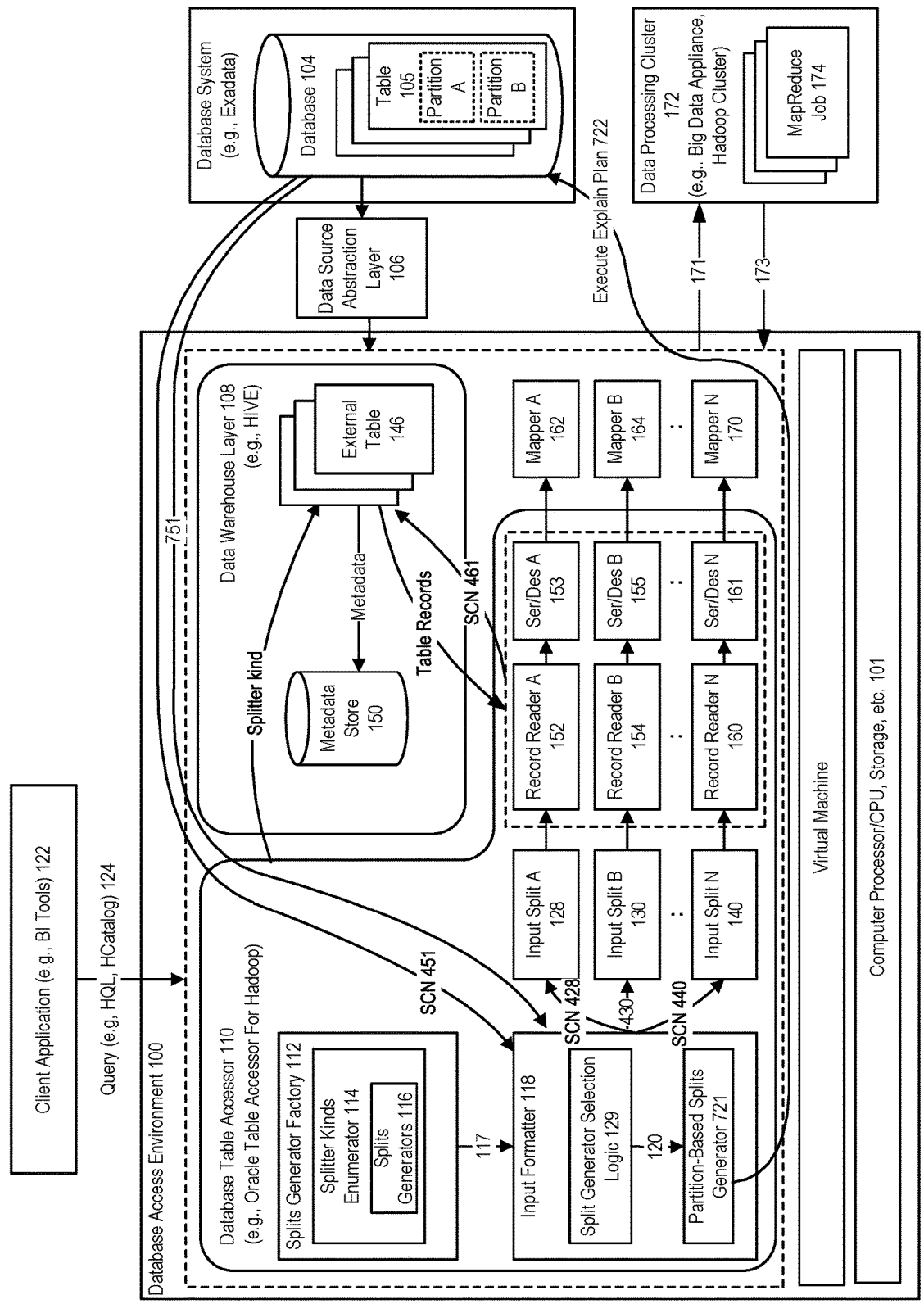
FIG. 7 illustrates a system for dynamically generating partition-based splits based on table properties and/or user preferences for use in a massively parallel or other distributed environment, in accordance with an embodiment.

FIG. 7 illustrates a system for generating query splits based on partition and sub-partitions of a database table for use in a massively parallel or other distributed environment. Overall and in accordance with an embodiment, partitioning allows a table to be subdivided into smaller pieces, where each piece of such a database table is called a partition. Each partition has its own name, and may optionally have its own storage characteristics. It is to be appreciated that partitioning enhances the performance, manageability, and availability of a wide variety of applications and helps reduce the total cost of ownership for storing large amounts of data. From the perspective of a database administrator, a partitioned table has multiple pieces that can be managed either collectively or individually. This gives the administrator considerable flexibility in managing partitioned tables. However, from the perspective of the application, a partitioned table is identical to a non-partitioned table; no modifications are necessary when accessing a partitioned table using SQL queries and DML statements.

Therefore, in accordance with an embodiment, described herein is a system and method for generating query splits based on partition and sub-partitions of a database table for use in a massively parallel or other distributed environment.

In accordance with an embodiment, a user can first create an external table in a data warehouse layer using a partitioned splitter as the splitter kind, wherein the external table is managed by a database table accessor and can be used to access a partitioned table in a database. When a query for selecting rows in the table is received, the database table accessor operates to choose an appropriate splits generator, execute an explain plan to derive a list of valid partitions relevant to the query, calculate the number of bytes and data included for each valid partition.

In accordance with an embodiment, the database table accessor can combine or split partitions/sub-partitions in the list of valid partitions based on a maximum split size defined in the massively parallel or other distributed environment (data processing cluster) such as Hadoop. If the size of a partition exceeds the maximum split size, the partition can be divided into multiple splits; if the total size of multiple partitions is less than the defined maximum size, the multiple partitions can be combined onto one split.

In accordance with an embodiment, an external table that includes a partition-based splitter kind is created as illustrated in the example of Listing 5 set out below:

| Listing 5 |
|---|
| CREATE EXTERNAL TABLE sales_test ( <br>     prod_id int, <br>     cust_name STRING, <br>     TIME_ID timestamp <br> ) <br> STORED BY 'oracle.hcat.osh.OracleStorageHandler' <br> TBLPROPERTIES ( <br>     'oracle.jdbc.url' = 'jdbc:oracle:thin:@localhost:1521:orcl', <br>     'oracle.jdbc.username' = 'scott', <br>     'oracle.jdbc.password' = 'tiger', <br>     'oracle.hcat.osh.tableName' = 'sales_test', <br>     'oracle.hcat.osh.splitterKind' = 'PARTITIONED_SPLITTER' <br> ); |

In accordance with an embodiment, when a query is received, the database table accessor can select a partition-based splits generator 721 based on the specified partition-bases splitter kind. The partitioned based splits generator can execute an explain plan 722 to inquire about the topology of the table and retrieve 751 the table partition information. In accordance with an embodiment, the explain plan is a structure query language (SQL) statement that displays how a database executes SQL statements, and can be used to view how the database accesses partitioned objects for specific queries.

In accordance with an embodiment, the partition-based splits generator can use the explain plan to obtain partition number ranges and generate partition names from the partition number ranges for the given query. In particular, the database table accessor can analyze the partition information with respect to the query to derive a valid list of partitions. As an illustrative example, if the query includes a predicate that narrows the selection to the first quarter and third quarter of the sales table, the valid list of partitions can include partitions for these two quarters; the partitions for the second and fourth quarters would be unwanted partitions and pruned.

In accordance with an embodiment, the partition-based splits generator can calculate the number of bytes, data included for each valid partition, combine or split partitions/sub-partitions in the list of valid partitions based on a maximum split size. For example, a partition can be divided into multiple splits if the size of the partition is greater than the maximum split size; and multiple partitions can be combined into one split if their total size is less than or equal to the maximum split size.

In accordance with an embodiment, the partition-based splits generator can generate query splits based on the partition-based table splits described above. The approach generates query splits based solely on the sizes of the partitions and by pruning unnecessary partitions/sub-partitions in the generating process. In accordance with an embodiment, a user needs not know the datasets in the partitioned table to use this approach.

Figure 8:
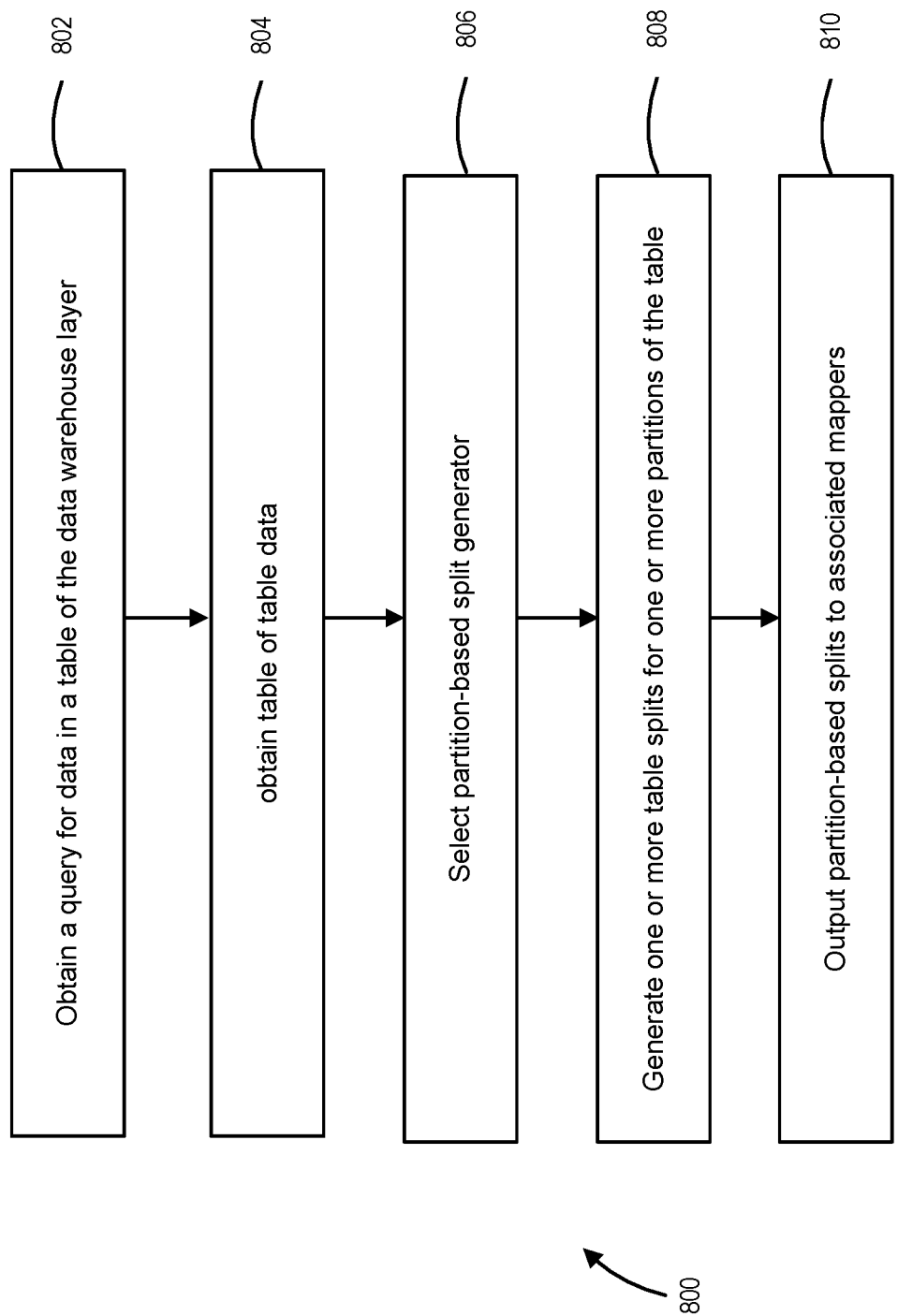
FIG. 8 is a flowchart that illustrates a method for dynamically generating partition-based splits based on table properties and/or user preferences for use in a massively parallel or other distributed environment, in accordance with an embodiment.

FIG. 8 is a flowchart that illustrates a method for dynamically generating partition-based splits based on table properties and/or user preferences for use in a massively parallel or other distributed environment, in accordance with an embodiment. With reference now to that Figure, a method 800 is shown for database split generation in an associated massively parallel or other distributed database environment including a plurality of databases and a data warehouse layer providing data summarization and querying of the plurality of databases. At step 802 the method obtains from an associated client application, a query for data in a table of the data warehouse layer. The query comprises query data representative of a user query and user preference data representative of a user preference.

At step 804 the method obtains, from the data warehouse layer, table data representative of one or more properties of the table, wherein the table data comprises partition data representative of a partition scheme of the table as having a partitioned topology wherein the table is logically divided into one or more partitions or an un-partitioned topology wherein the table is logically undivided.

At step 806 the method selects a partition-based splits generator in accordance with one or more of the query data indicating a user preference for a partition-based splits generator or the partition data indicating the partition scheme of the table as having the partitioned topology.

At step 808 the method generates, by the selected partition-based splits generator, one or more table splits for each of the one or more partitions of the table, the one or more table splits dividing the user query into a plurality of query splits.

At step 810 the method outputs the plurality of query splits to a plurality of associated mappers for execution by the plurality of associated mappers of each of the plurality of query tasks against the table.

In one embodiment, the generating the one or more table splits for each of the one or more partitions of the table includes sub-steps of obtaining partition size data representative of a partition size of each of the one or more partitions of the table, obtaining split size data representative of a maximum split size of each of the plurality of query splits, comparing the split size data with the partition size data and storing a result of the comparing as comparison data, and generating the one or more table splits for each of the one or more partitions of the table in accordance with the comparison data.

In another embodiment, the generating the one or more table splits for each of the one or more partitions of the table includes sub-steps of determining the partition size is less than the maximum split size in accordance with the comparison data, and generating a single table split for a plurality of partitions in accordance with determining the partition size is less than the maximum split size.

Size-Based Splits

In accordance with a further embodiment, a method for size-based database split generation in an associated massively parallel or other distributed database environment including a plurality of databases and a data warehouse layer providing data summarization and querying of the plurality of databases is provided. A query for data in a table of the data warehouse layer is obtained from an associated client application, the query comprising one or more of query data representative of a user query that selects all columns in the Hive table or user preference data representative of a user preference. Table data representative of one or more properties of the table is obtained from the data warehouse layer, and data representative of a data query result size limit is obtained from one or more of the query data or the table data size. The method further includes determining one or more ranges of the table in accordance with the size data, and selecting a size-based splits generator in accordance with one or more of the query data indicating a user preference for a size-based splits generator or the table data indicating a size of the table as having predetermined selected size. The method further includes generating, by the selected size-based splits generator, a single size-based split query for each of the one or more ranges of the table, and outputting the single size-based split query for each of the one or more ranges of the table to a plurality of associated mappers for execution by the plurality of associated mappers of the single size-based split query for each of the one or more ranges against the table.

With reference back again to FIG. 6, when it is determined at control block 622 that the data in the table is unpartitioned, the database table accessor 110 initiates a control function at control block 630 to determine whether the data in the table is of a fixed size, and a control function at control block 640 when the table is not of a fixed size to determine a number of records in the table. When it is determined at control blocks 622, 632 that the data in the table is unpartitioned and not of a fixed size, the split generator selection logic 129 selects a limit-based splits protocol at control block 656 for generating a limit-based splits generator 121 (FIG. 1). However, when it is determined at control blocks 622, 630 that the data in the table is unpartitioned and of a fixed size, the database table accessor 110 can determine from the metadata store 150 whether the data in the table is of an unknown database chunk size at control block 640 or whether the data in the table is of a known size at control block 642. When it is determined at control block 640 that the data in the table is of an unknown database chunk size, the split generator selection logic 129 selects a size-based splits protocol at control block 652 for generating a size-based splits generator 121 (FIG. 1).

Figure 9:
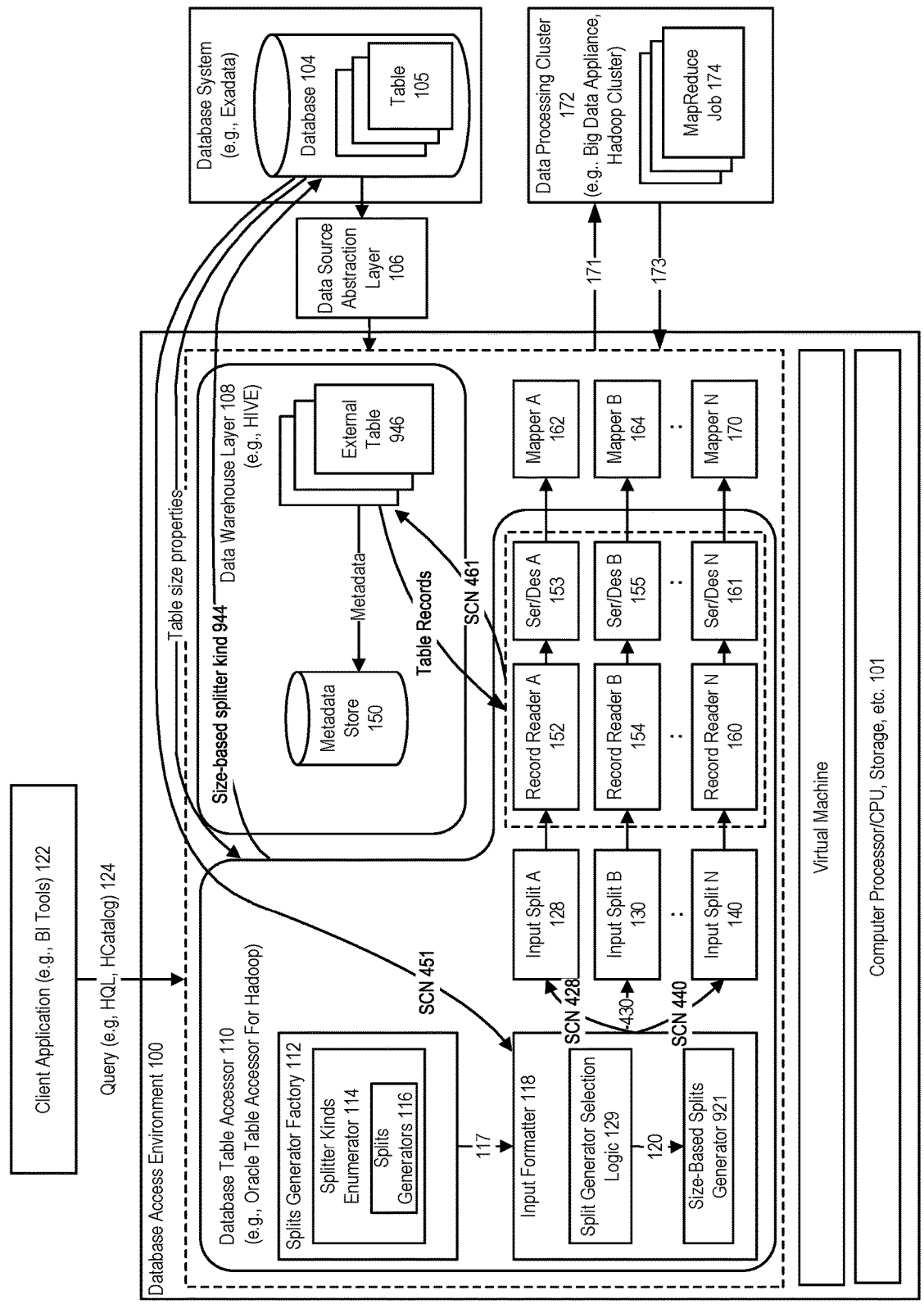
FIG. 9 illustrates a system for dynamically generating size-based splits based on table properties and/or user preferences for use in a massively parallel or other distributed environment, in accordance with an embodiment.

In accordance with an embodiment and with reference next to FIG. 9, due to memory constraints, a mapper can only process a certain number of table records. Feeding too many records into a mapper can cause the mapper to hang. As such, it is beneficial to control the size of each input split using the size-based split generator at control block 652 (FIG. 6).

FIG. 9 illustrates a system for generating size-based splits for use in a massive parallel environment, in accordance with an embodiment, and includes a database table accessor and a data warehouse layer, where the database table accessor, upon receiving a query for data in a table, can select a sized-based splits generator based on properties of the table and user preferences specified in an external table created in the data warehouse layer. In accordance with an embodiment, the sized-based splits generator divides the table into multiple chunks of a user-defined size but the last chunk, creates row ranges for each chunk, and uses the row ranges to split the query into multiple query splits. To generate input splits based on a user-defined size, a user can create an external table in the data warehouse layer with a user-defined size as the splitter kind.

As shown in FIG. 9, to generate input splits based on a user-defined size, a user can create an external table 946 in the data warehouse layer with a user-defined size as the splitter kind, which is further illustrated in the example pseudocode of Listing 6 set out below:

---
Listing 6
---

```
CREATE EXTERNAL TABLE sales_test (
    prod_id int,
    cust_name STRING,
    TIME_ID timestamp
)
STORED BY 'oracle.hcat.osh.OracleStorageHandler'
TBLPROPERTIES (
    'oracle.jdbc.url' = 'jdbc:oracle:thin:@localhost:1521:orcl',
```

-continued

Listing 6

```
'oracle.jdbc.username' = 'scott',
'oracle.jdbc.password' = 'tiger',
'oracle.hcat.osh.tableName' = 'sales_test',
'oracle.hcat.osh.splitterKind' = 'SIZED_RANGE',
'oracle.hcat.osh.splitterKind' = '256M'
);
```

As shown in the Listing 6 above, the splitter kind is defined as SIZED-RANGE. In accordance with an embodiment, the 'oracle.hcat.osh.splitterKind'='256M' is not required; the size can be derived from the Hadoop input split size (mapreduce.input.fileinputformat.split.maxsize).

As further shown in FIG. 9, the database table accessor can receive a query for data in the database table, wherein the query, in accordance with an embodiment, can select all rows in the table. The database table accessor can choose a sized-based splits generator 921 based on the splitter kind (i.e. user hint/preference including a given split size) and properties of the table, and use the sized-based splits generator to calculate the total size of the table and divide the table into multiple chunks of the given size.

In accordance with an embodiment, the database table accessor can mine the data dictionary of the table and create row ranges for each chunk of the table. In accordance with an embodiment, each row range can have n rows, wherein the sum of the n rows is the user-defined size or a default size of 128M, but for the last chunk, which can be less than the user-defined size or the default size.

In accordance with an embodiment, the database table accessor can calculate the row ranges using the total number of blocks occupied by the table, the size of each block, and the total number of rows in the table. For example, using the total number of blocks and the size of each block, the database table accessor can figure out the number of rows per block, and row ranges per block.

In accordance with an embodiment, the database table accessor can use the row ranges to split the query into multiple query splits, where each query split is then embedded into an input split object and provided to a record reader for execution against the external table.

Figure 10:
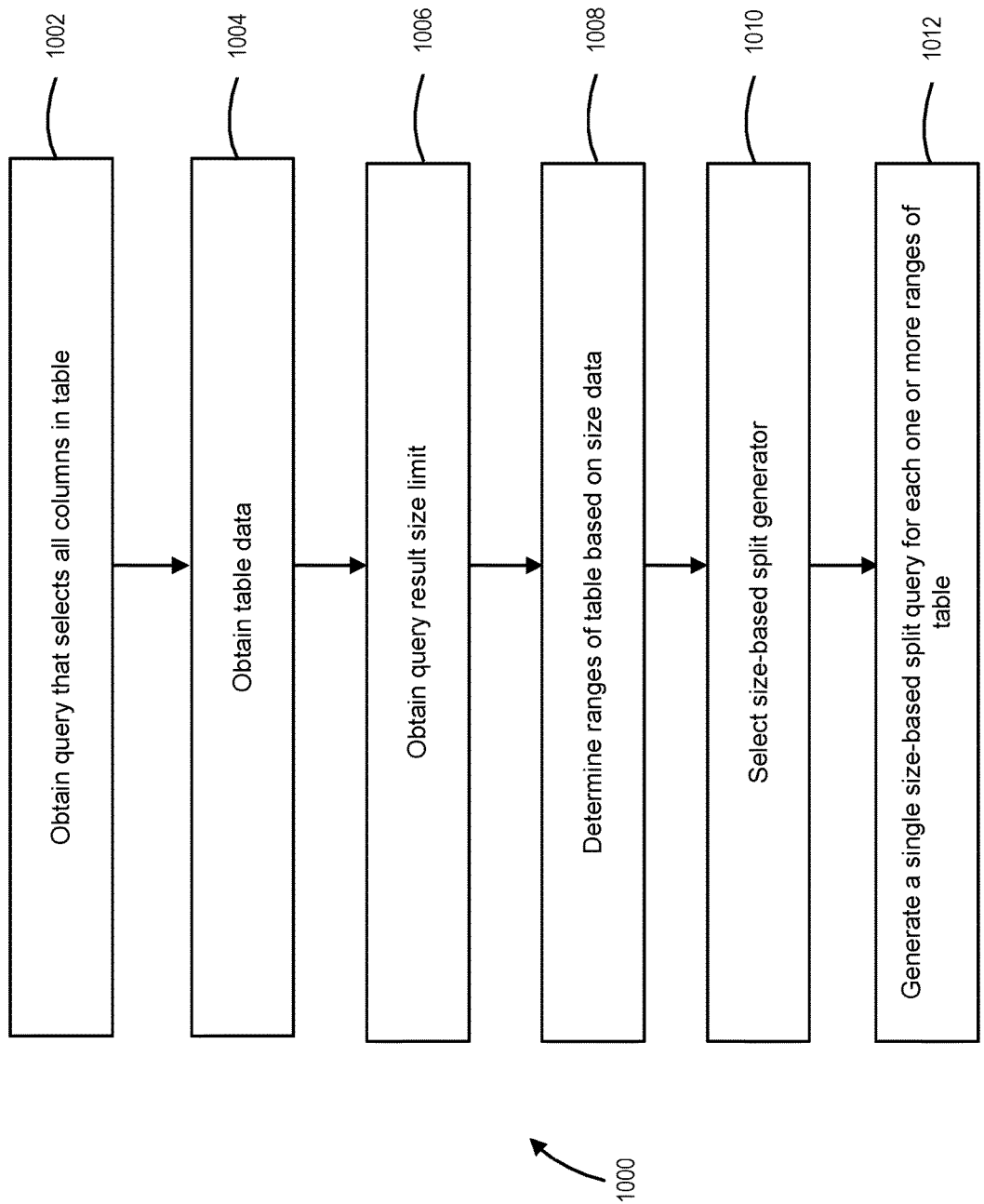
FIG. 10 is a flowchart that illustrates a method for dynamically generating size-based splits based on table properties and/or user preferences for use in a massively parallel or other distributed environment, in accordance with an embodiment.

FIG. 10 is a flowchart that illustrates a method 1000 for dynamically generating size-based splits based on table properties and/or user preferences for use in a massively parallel or other distributed environment, in accordance with an embodiment. At step 1002 the method obtains, from an associated client application, a query for data in a table of the data warehouse layer, the query comprising one or more of query data representative of a user query that selects all columns in the table or user preference data representative of a user preference.

At step 1004 the method obtains, from the data warehouse layer, table data representative of one or more properties of the table, and at step 1006 the method obtains from one or more of the query data or the table data size data representative of a data query result size limit.

At step 1008 the method determines one or more ranges of the table in accordance with the size data, and at step 1010 the method selects a size-based splits generator in accordance with one or more of the query data indicating a user preference for a size-based splits generator or the table data indicating a size of the table as having predetermined selected size.

At step 1012 the method generates, by the selected size-based splits generator, a single size-based split query for each of the one or more ranges of the table.

The method then outputs the single size-based split query for each of the one or more ranges of the table to a plurality of associated mappers for execution by the plurality of associated mappers of the single size-based split query for each of the one or more ranges against the table.

ROWID Range-Based Splits

In accordance with a further embodiment, a method for ROWID-based database split generation in an associated massively parallel or other distributed database environment including a plurality of databases and a data warehouse layer providing data summarization and querying of the plurality of databases is provided. A query for data in a table of the data warehouse layer is obtained from an associated client application, the query comprising one or more of query data representative of a user query that selects all columns in the table or user preference data representative of a user preference. Table data representative of one or more properties of the table is obtained from the data warehouse layer, the table data comprising files, data blocks, and row numbers for the table in accordance with the user query for blocks of data in the table. The method further includes creating multiple block ranges for the blocks of data in the table in accordance with the user query, and creating for each of the multiple block ranges ROWID range data, the ROWID range data being representative of pseudo columns of the table that serve as unique identifiers for a row of the table. The method further includes selecting a ROWID-based splits generator in accordance with one or more of the query data indicating the user query that selects all columns in the table or the user preference data indicating a user preference for a ROWID-based splits generator, and generating, by the selected ROWID-based splits generator, table splits dividing the user query into a plurality of ROWID query splits wherein each of the ROWID query splits is associated with one of the multiple block ranges in accordance with the ROWID range data. The method further includes outputting the plurality of ROWID query splits to a plurality of associated mappers for execution by the plurality of associated mappers of the plurality of ROWID query splits against the table.

With reference back again to FIG. 6, when it is determined at control block 622 that the data in the table is unpartitioned, the database table accessor 110 initiates a control function at control block 630 to determine whether the data in the table is of a fixed size, and a control function at control block 640 when the table is not of a fixed size to determine a number of records in the table. When it is determined at control blocks 622, 632 that the data in the table is unpartitioned and not of a fixed size, the split generator selection logic 129 selects a limit-based splits protocol at control block 656 for generating a limit-based splits generator 121 (FIG. 1). However, when it is determined at control blocks 622, 630 that the data in the table is unpartitioned and of a fixed size, the database table accessor 110 can determine from the metadata store 150 whether the data in the table is of an unknown database chunk size at control block 640 or whether the data in the table is of a known size at control block 642. When it is determined at control block 642 that the data in the table is of an known database chunk size, the split generator selection logic 129 selects a ROWID-based splits protocol at control block 654 for generating a ROWID-based splits generator 121 (FIG. 1).

As noted above, when it is determined at control block 642 that the data in the table is of an known database chunk size, the split generator selection logic 129 selects a ROWID-based splits protocol at control block 654 for generating a ROWID-based splits generator 121 (FIG. 1). In this regard and in accordance with an embodiment, every record in a database table can be associated with a ROWID, a pseudo column that uniquely identifies a row within the table. In accordance with an embodiment, each ROWID can change when a table is reorganized, exported or imported. In accordance with an embodiment, in a partitioned table, a ROWID can also change when a row corresponding to the ROWID migrates from one partition to another.

In accordance with an embodiment, ROWIDs need not be physically stored in a database. For example, an Oracle database can generate a ROWID when the ROWID is queried.

In accordance with an embodiment, a ROWID can be associated with a file number, a block number, and a row number in which a row is stored.

Figure 11:
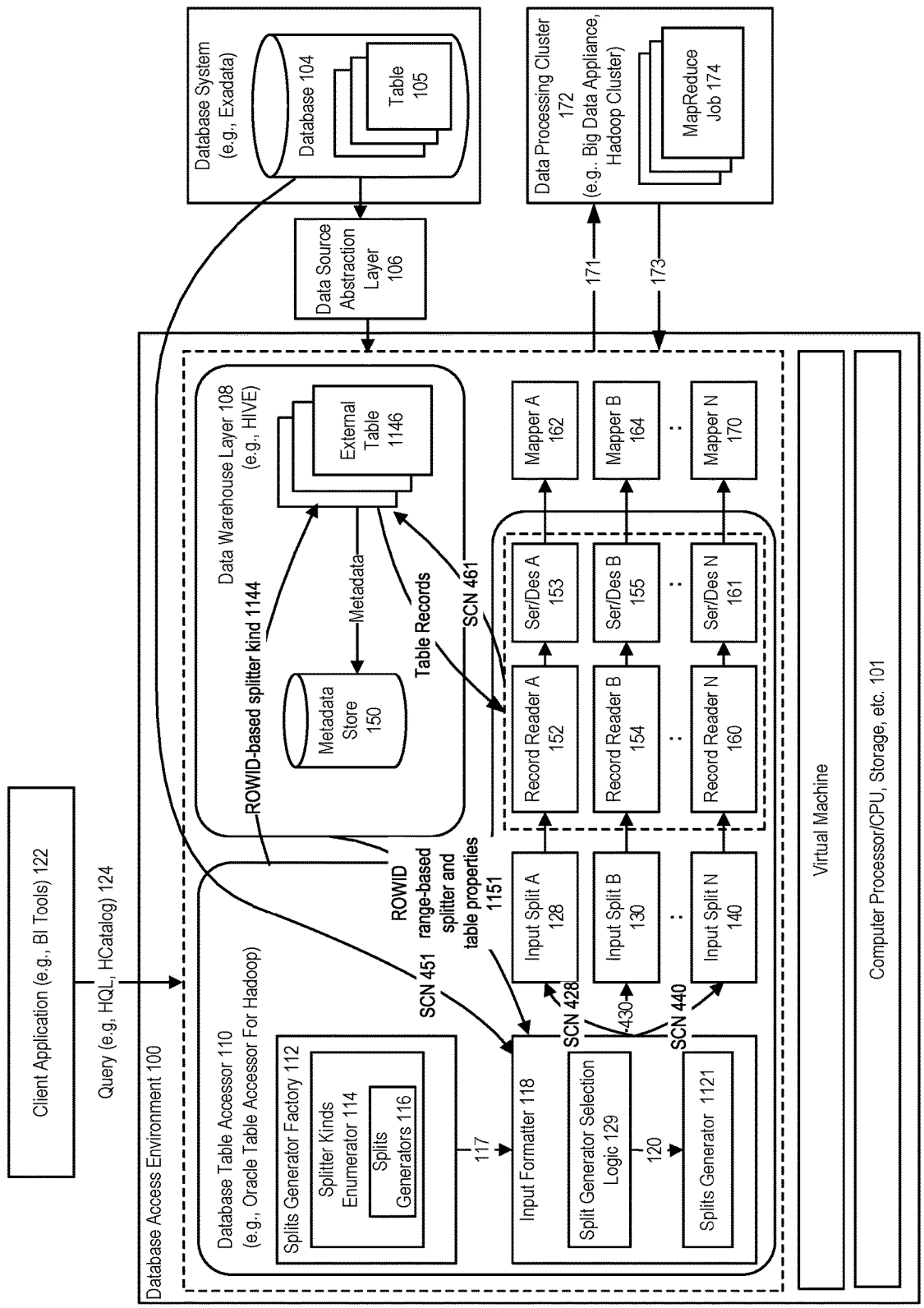
FIG. 11 illustrates a system for dynamically generating ROWID-based splits based on table properties and/or user preferences for use in a massively parallel or other distributed environment, in accordance with an embodiment.

FIG. 11 illustrates a system for generating ROWID-based splits for use in a massive parallel environment, in accordance with an embodiment. As shown in FIG. 11, in accordance with an embodiment, an external table 1146 can be created for a database table, wherein the external table is managed by a database table accessor and with a ROWID range specified as the splitter kind (user hint/preference).

In accordance with an embodiment, an example DDL syntax for creating such an external table in the data warehouse layer can be illustrated in Listing 7, where a splitter kind is defined to be ROWID_RANGE.

Listing 7

```
CREATE EXTERNAL TABLE sales_test (
    prod_id int,
    cust_name STRING,
    TIME_ID timestamp
)
STORED BY 'oracle.hcat.osh.OracleStorageHandler'
TBLPROPERTIES (
    'oracle.jdbc.url' = 'jdbc:oracle:thin:@localhost:1521:orcl',
    'oracle.jdbc.username' = 'scott',
    'oracle.jdbc.password' = 'tiger',
    'oracle.hcat.osh.tableName' = 'sales_test',
    'oracle.hcat.osh.splitterKind' = 'ROWID_RANGE';
);
```

As shown in Listing 7, the value of the ROWID_RANGE is not specified. In accordance with an embodiment, when a value of the splitter kind is not specified, a default value can be used.

As further shown in FIG. 11, in accordance with an embodiment, when a user or an application issues a query that selects all rows in the database table, the database table accessor, based on properties of the database table and the user hint obtained 1151 from the data warehouse layer, can choose a ROWID-based splits generator 1121. In accordance with an embodiment, the database table accessor can then obtain files, data blocks and row numbers for the table, and create multiple block ranges from the blocks selected, where each block range has a fixed-size number of blocks but for the last range.

In accordance with an embodiment, when a user or an application issues a query that selects all rows in the database table, the database table accessor, based on properties of the database table and the user hint obtained from the data warehouse layer, can choose a ROWID-based splits generator. In accordance with an embodiment, the database table accessor can then obtain files, data blocks and row numbers for the table, and create multiple block ranges from the blocks selected, where each block range has a fixed-size number of blocks but for the last range.

In accordance with an embodiment, the database table accessor can create ROWIDs for each block range using files and row numbers, wherein one ROWID is created per block, which makes one ROWID range per block range.

In accordance with an embodiment, the database table accessor can split the query into multiple smaller or query splits based on the ROWID ranges created on each block range, where each query split is then embedded into an input split object and provided to a record reader for execution against the external table.

In accordance with an embodiment, the ROWID range splitter kinds can be dynamically modified during implementation. For example, for the partition-based splitter kind, if a large partition is detected that does not contain much data, the database table accessor can merge the partition with one or more other partitions. Similarly, if a partition is detected that contains too much data, the partition can be split into multiple smaller partitions.

Figure 12:
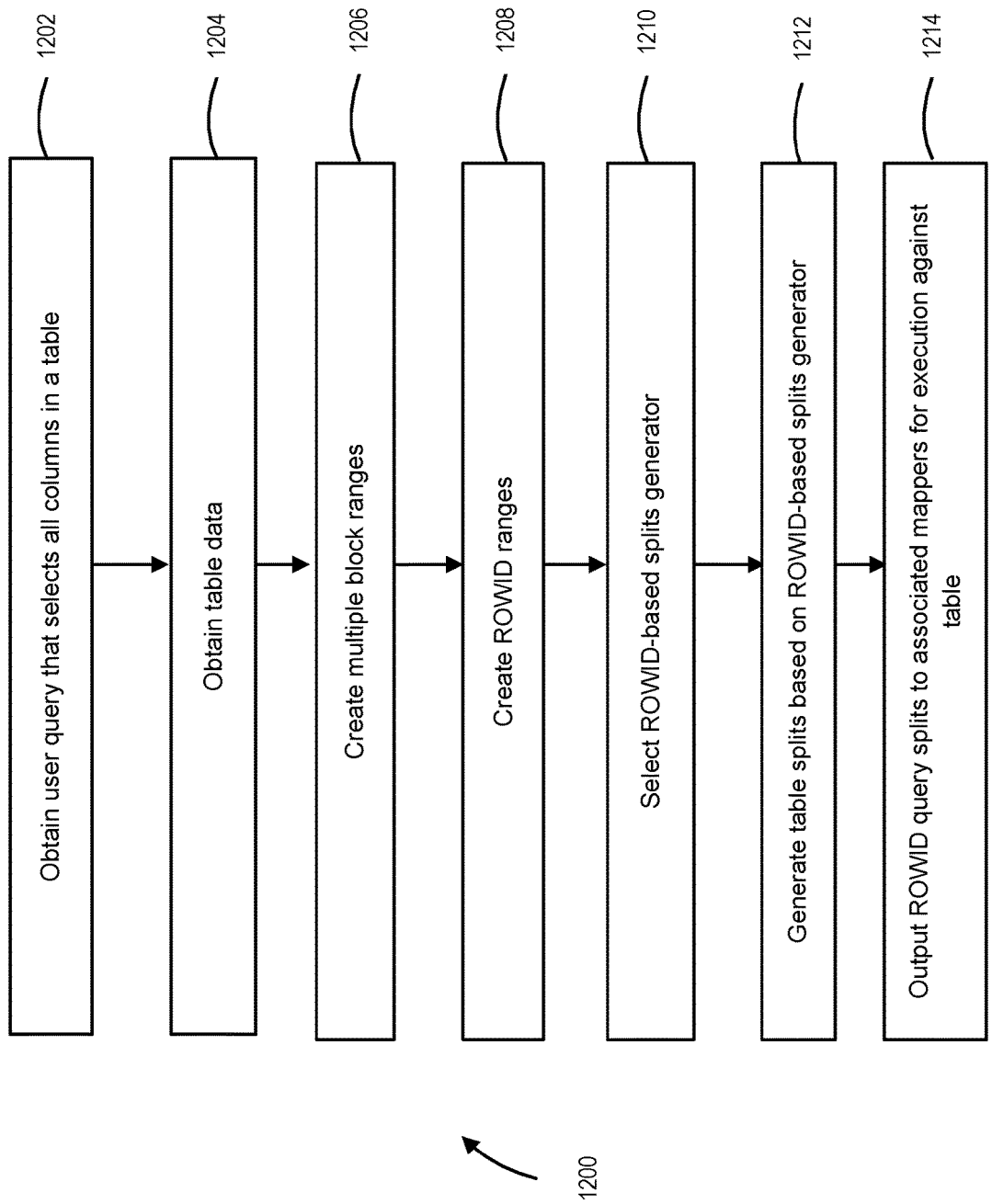
FIG. 12 is a flowchart that illustrates a method for dynamically generating ROWID-based splits based on table properties and/or user preferences for use in a massively parallel or other distributed environment, in accordance with an embodiment.

FIG. 12 is a flowchart that illustrates a method for dynamically generating ROWID-based splits based on table properties and/or user preferences for use in a massively parallel or other distributed environment, in accordance with an embodiment. With reference now to that Figure, a method 1200 is illustrated for database ROWID-based split generation in an associated massively parallel or other distributed database environment including a plurality of databases and a data warehouse layer providing data summarization and querying of the plurality of databases. The method 1200 obtain at step 1202, from an associated client application, a query for data in a table of the data warehouse layer, the query comprising one or more of query data representative of a user query that selects all columns in the table or user preference data representative of a user preference.

At step 1204 the method obtains, from the data warehouse layer, table data representative of one or more properties of the table, the table data comprising files, data blocks, and row numbers for the table in accordance with the user query for blocks of data in the table.

At step 1206 the method creates multiple block ranges for the blocks of data in the table in accordance with the user query, and at step 1208 the method creates for each of the multiple block ranges ROWID range data, the ROWID range data being representative of pseudo columns of the table that serve as unique identifiers for a row of the table.

At step 1210 the method selects a ROWID-based splits generator in accordance with one or more of the query data indicating the user query that selects all columns in the table or the user preference data indicating a user preference for a ROWID-based splits generator.

At step 1212 the method generates, by the selected ROWID-based splits generator, table splits dividing the user query into a plurality of ROWID query splits wherein each of the ROWID query splits is associated with one of the multiple block ranges in accordance with the ROWID range data.

At step 1214 the method outputs the plurality of ROWID query splits to a plurality of associated mappers for execution by the plurality of associated mappers of the plurality of ROWID query splits against the table.

High-Speed Data Transfer from JDBC

Figure 13:
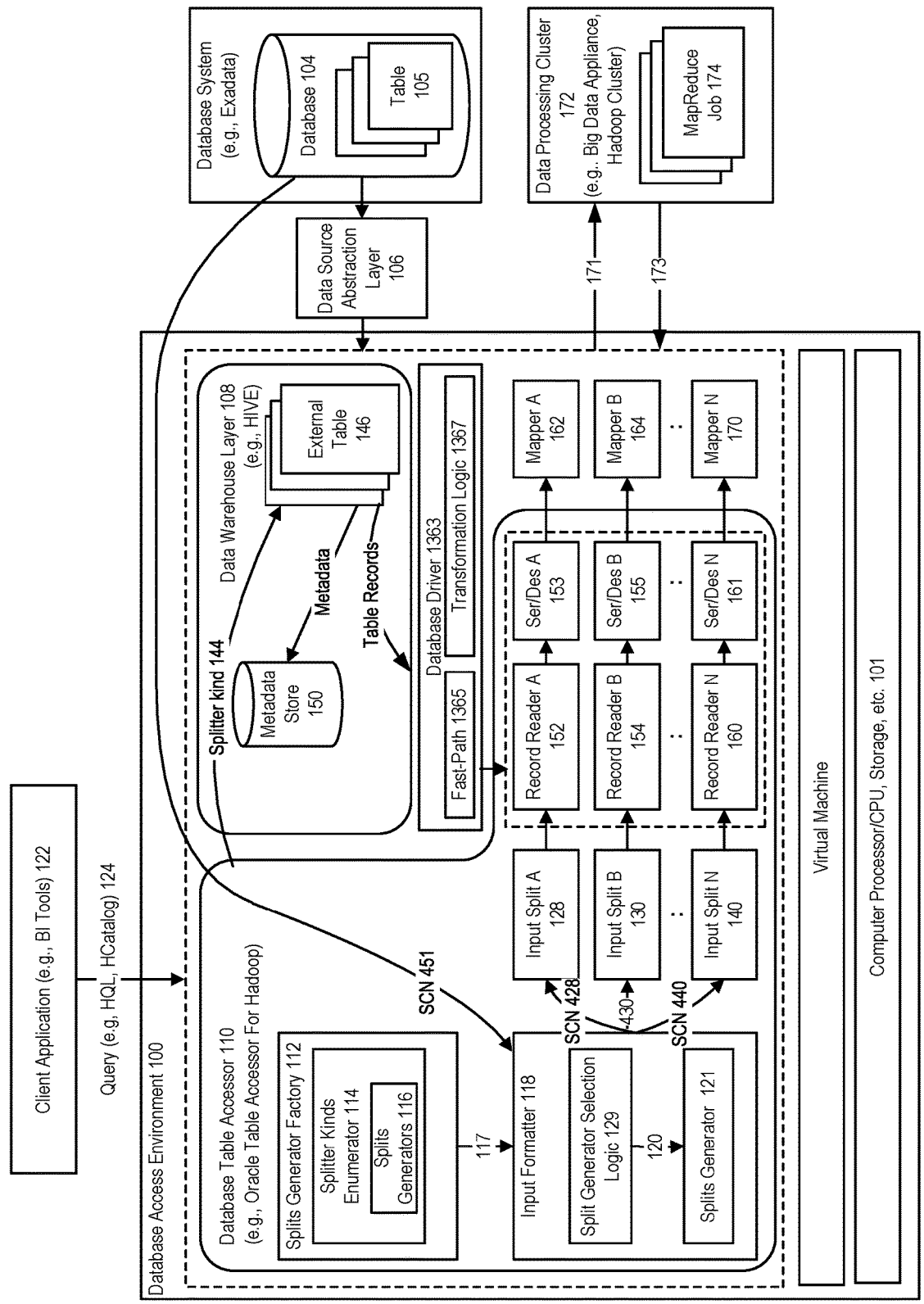
FIG. 13 illustrates a system for providing rapid transfer of data from a database driver to generic writable interfaces in a data warehouse layer, in accordance with an embodiment.

FIG. 13 illustrates a system for providing rapid transfer of data from a database driver to generic writable interfaces in a data warehouse layer, in accordance with an embodiment. in particular, in accordance with an embodiment, the figure illustrates a system and method for high-speed data transfer from JDBC to a data warehouse for use with a massively parallel or other distributed database environment for providing high speed data transfer between a plurality of databases of the database environment and a data warehouse layer providing data summarization and querying of the plurality of databases. The method of the illustrated embodiment includes obtaining, from an associated client application, a query for data in a table of the data warehouse layer, the query comprising query data representative of a user query and user preference data representative of a user preference. The method further includes obtaining table data representative of one or more properties of the table, determining a splits generator in accordance with one or more of the user preference or the one or more properties of the table, and generating, by the selected splits generator, table splits dividing the user query into a plurality of query splits. The method further includes outputting the plurality of query splits to a database driver comprising a data transformation logic component and a fast path application programming interface (API), and receiving result data derived from executing the plurality of queries by associated mappers against the table. The method further includes selectively transforming, by fast path API of the database driver, the result data from a format of the table to a data mining tool format directly usable by one or more components of the associated data warehouse layer.

As described above, the database table accessor can be used to retrieve data from a relational database via a data warehouse layer (e.g., HIVE) and transfer the data to a data warehouse layer (e.g., HIVE) for data mining.

The database table accessor typically obtains the data using methods such as getDate( ), getTimestamp( ) and getString( ) on a ResultSet in a database driver, e.g., a JDBC driver. These methods convert the data from database formats to Java core formats such as java.sql.Date, java.sql.Timestamp, java.lang.String. In accordance with an embodiment, Java objects can be immutable objects that cannot be changed once created. As such, they can be multiple copies of a data object, which stress the heap and impact performance for data mining.

Data mining tools such as HIVE needs a high speed data transfer mechanism without multiple conversions from e.g., Oracle database formats to Java formats and then to data mining tool formats; and without multiple copies of a data object.

In accordance with an embodiment, described herein is a system and method for providing rapid transfer of data from a database driver to generic writable interfaces in a data warehouse layer (e.g., HIVE).

In accordance with an embodiment, the system includes a database driver used to obtain data from a database table to a data warehouse layer (e.g., HIVE), where the database driver includes a data transformation logic component and a fast path API. When a result set is returned from the database table, the database driver can perform a check to determine whether a fast conversion capability is supported, and if it is, transform the data from database formats to data mining tool formats using the fast path API and in accordance with a logic defined in the data transformation logic component.

As shown in FIG. 13, a database driver 1363, e.g., a JDBC driver, can be used to retrieve data from a database table 105 for use by the data warehouse layer. The database driver includes a fast path API 1365 and a data transformation logic component 1367. When data is returned from the database table via the external table, the database driver can dynamically check the capability of fast-conversion in the database driver and cache the state. In accordance with an embodiment, the capability check can be performed using Java reflection to examine methods in the database driver.

In accordance with an embodiment, if a fast conversion capability is supported by the database driver, the fast path API can be used to perform the data transformation in accordance with a logic defined in the data transformation logic component. In accordance with an embodiment, the data transformation logic can be defined by users based on their data mining needs.

In accordance with an embodiment, data types in data mining tool formats can be similar to Java object types, e.g., a string object. However, new objects need not be created every time; instead, a same object can be used for holding intermediate data for data mining. As such, multiple copies of a same data are can be avoided.

The following pseudo code illustrates an example implementation of the method for providing rapid transfer of data from a database driver to generic writable interfaces in a data warehouse layer, in accordance with an embodiment.

---
Listing 8
---

```
oracle.jdbc.internal.OracleResultSet:
/**
 * @returns the number of bytes copied into the buffer
 */
public int getBytes(int parameterIndex, byte[ ] buffer, int offset) throws SQLException;
DynamicByteArray::getBytes
int getBytes(int dataOffset, int dataLength, byte[ ] buffer, int byteOffset):
if (data == CHAR OR data == VARCHAR)
    if(uniByte OR networkCharSet ==UTF8)
        Then copy-bytes-to-buffer;
    else
        Then convert to UTF8 bytes;
DateAccessor::getBytes
int getBytes(int rowIndex, byte[ ] buffer, int byteOffset):
if(isNull( ) )
    return 0
else
    convert-date-to-seconds since 1 Jan 1970
    Serialize seconds onto byte[ ]
    return 4 // size of int
TimestampAccessor::getBytes
int getBytes(int rowIndex, byte[ ] buffer, int byteOffset):
if(isNull( ) )
    return 0
else
    convert-date-to-milli-seconds since 1 Jan 1970
    Serialize seconds onto byte[ ]
    Serialize nano-seconds to byte[ ]
    return 12 // size of long + 4 bytes nano seconds
Reader:refreshColumns:
Dynamically check the capability of fast-conversion in the driver
Cache the state
if(fastPath)
    use fast path API to get byte[ ]
    use byte[ ] with Writable
else
    use regular access
```

---

Figure 14:
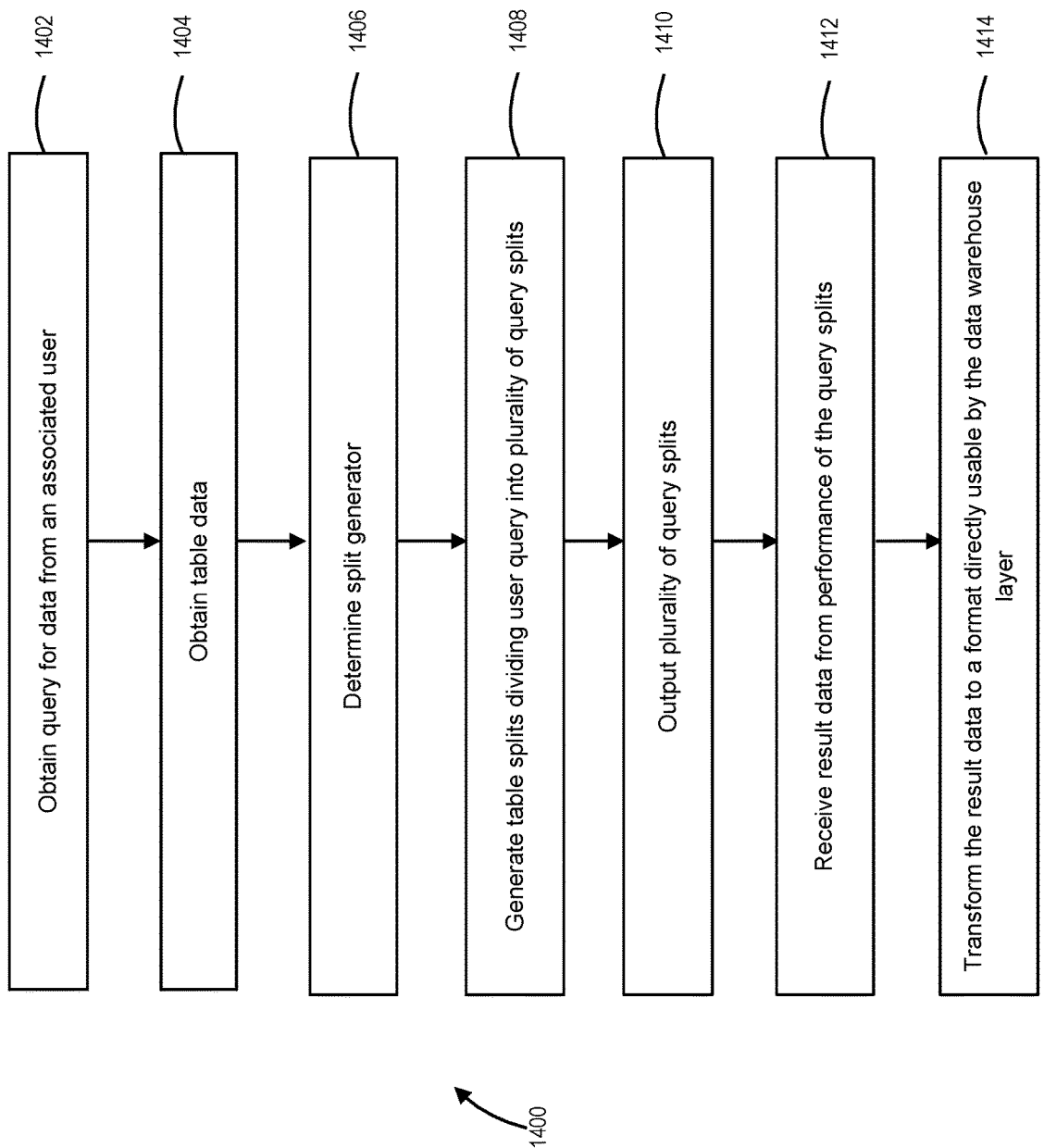
FIG. 14 is a flowchart that illustrates a method for providing rapid transfer of data from a database driver to generic writable interfaces in a data warehouse layer, in accordance with an embodiment.

FIG. 14 is a flowchart that illustrates a method 1400 for rapid transmission of data such as Oracle Java Database Connectivity (JDBC) data to a writable format such as a HADOOP writable format. In accordance with an embodiment and with reference now to that Figure, a method 1400 is illustrated for use with a massively parallel or other distributed database environment for providing high speed data transfer between a plurality of databases of the database environment and a data warehouse layer providing data summarization and querying of the plurality of databases. At step 1402 the method obtains, from an associated client application, a query for data in a table of the data warehouse layer, the query comprising query data representative of a user query and user preference data representative of a user preference.

At step 1404 the method obtains table data representative of one or more properties of the table, and at step 1406 the method determines a splits generator in accordance with one or more of the user preference or the one or more properties of the table.

At step 1408 the method generates, by the selected splits generator, table splits dividing the user query into a plurality of query splits, and at step 1410 outputs the plurality of query splits to a database driver comprising a data transformation logic component and a fast path application programming interface (API).

At step 1412 the method receives result data derived from executing the plurality of queries by associated mappers against the table, and at step 1414 the method selectively transforms, by fast path API of the database driver, the result data from a format of the table to a data mining tool format directly usable by one or more components of the associated data warehouse layer.

Optimized Query Processing with Table-Level Predicate Pushdown

When a query is executed in a data warehouse layer (e.g., HIVE), the data is selected and query predicates are applied at the data warehouse layer to filter the rows that the query does not cover. A query executed as described above can have poor performance since the whole table is transported to a data warehouse layer for row trimming. In addition, such queries may not even be executed because of memory constraints if the table is large.

In accordance with an embodiment, predicate pushdown is a feature where query predicates are pushed down to the storage nodes for analysis for high throughput. In a query, e.g., a SQL statement, portions of the SQL statement, specifically ones that filter data, are referred to as predicates. By pushing some query predicates down to a level as low as possible, query performance can be improved by avoiding transferring all the rows in a table to a data warehouse layer when only one or two rows that a query is to retrieve.

In accordance with an embodiment, described herein is a system and method for optimizing query processing with predicates pushdown from a data warehouse layer to table level in a database. In accordance with an embodiment, predicate pushdown at the table level can be achieved by using standard properties of an external table, wherein the external table is created with a query and predicates of the query for pushdown defined as table properties. When a query for selecting rows in the table is received, the database table accessor operates to choose an appropriate splits generator, use a query formulator to formulate the query so that the query predicates can be executed at the table level.

In accordance with an example embodiment, a method is provided for split query processing with table level predicate pushdown in a massively parallel or other distributed database environment including a plurality of databases and a data warehouse layer providing data summarization and querying of the plurality of databases. The method includes obtaining, from an associated client application, a query for data in a table of the data warehouse layer, the query comprising query data representative of a user query, query predicate data representative of one or more predicates of the user query, and user preference data representative of a user preference, wherein the one or more predicates of the user query comprise portions of the user query operative to filter data. The method further includes obtaining table data representative of one or more properties of the table, determining a splits generator in accordance with one or more of the user preference or the one or more properties of the table, and generating, by the selected splits generator, table splits dividing the user query into a plurality of query splits. The method further includes formulating the plurality of query splits to include the query predicate data representative of the one or more predicates of the user query, and outputting the plurality of query splits to an associated plurality of mappers for execution by the associated plurality of mappers of each of the plurality of query splits against the table, wherein the one or more predicates of the user query may be executed at a logical execution level of the table.

Figure 15:
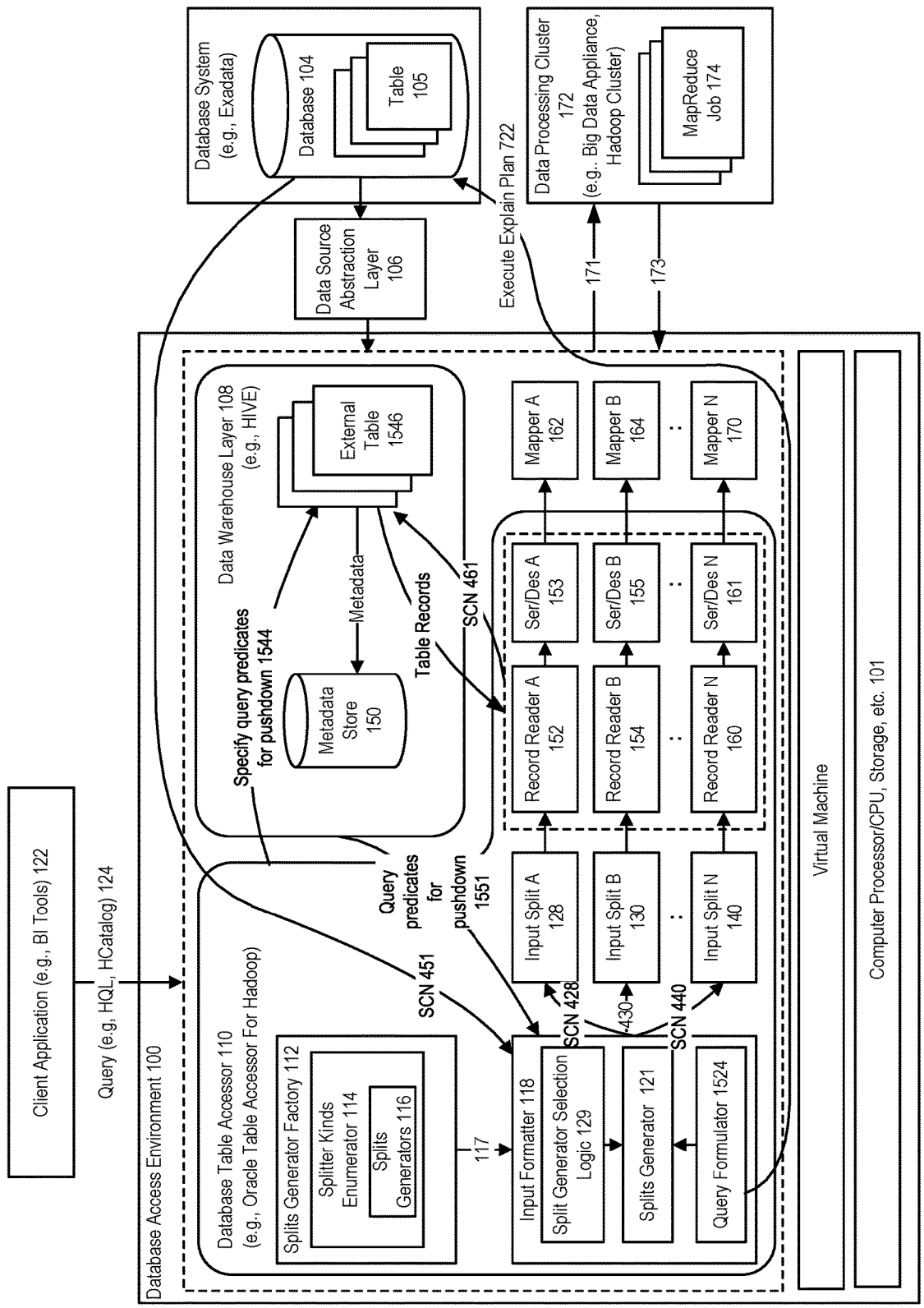
FIG. 15 illustrates a system for providing query processing with table-level predicate pushdown in a data warehouse layer, in accordance with an embodiment.

FIG. 15 illustrates a system for optimizing query processing with predicates pushdown to table level in a database from a data mining tool, in accordance with an embodiment.

As shown in FIG. 15, an external table 1546 can be created with a query and query predicates for pushdown to the table level defined 1544 as properties of the external table wherein the external table is managed by the database table accessor and can be used to access the database table.

In accordance with an embodiment, an example DDL syntax for creating such an external table in the data warehouse layer can be illustrated in Listing 9.

Listing 9

```
CREATE EXTERNAL TABLE sales_q2 (
    prod_id int,
    cust_name STRING,
    TIME_ID timestamp
)
STORED BY 'oracle.hcat.osh.OracleStorageHandler'
TBLPROPERTIES (
    'mapreduce.jdbc.url' = 'jdbc:oracle:thin:@adc2171607:9221:dbjMt',
    'mapreduce.jdbc.username' = 'scott',
    'mapreduce.jdbc.password' = 'tiger',
    'mapreduce.jdbc.input.table.name' = 'sales_test',
    'oracle.hcat.osh.splitterKind' = 'PARTITIONED_TABLE',
    'mapreduce.jdbc.input.guery' = 'SELECT prod_id, cust_name, time_id from sales_test',
    'mapreduce.jdbc.input.conditions' = 'time_id = to_date(\'10-jun-2006\', \'dd-mon-yyyy\')'
);
```

As illustrated in Listing 9, an external table is created with a query and query predicates for pushdown to the table level specified in the external table definition.

As further shown in FIG. 15, in accordance with an embodiment, when a query is received that selects all rows in the database table, the database table accessor can choose an appropriate splits generator 1521 to generate query splits, and additionally identify if the query is defined as parameters or properties of the external table using information retrieved 1551 from the data warehouse layer. The database table accessor subsequently can invoke a query formulator 1524 to formulate each query split based on the information from the external table metadata store in a way that the predicates defined for pushdown therein are added to a SQL statements and passed to the database for execution at the table level.

Figure 16:
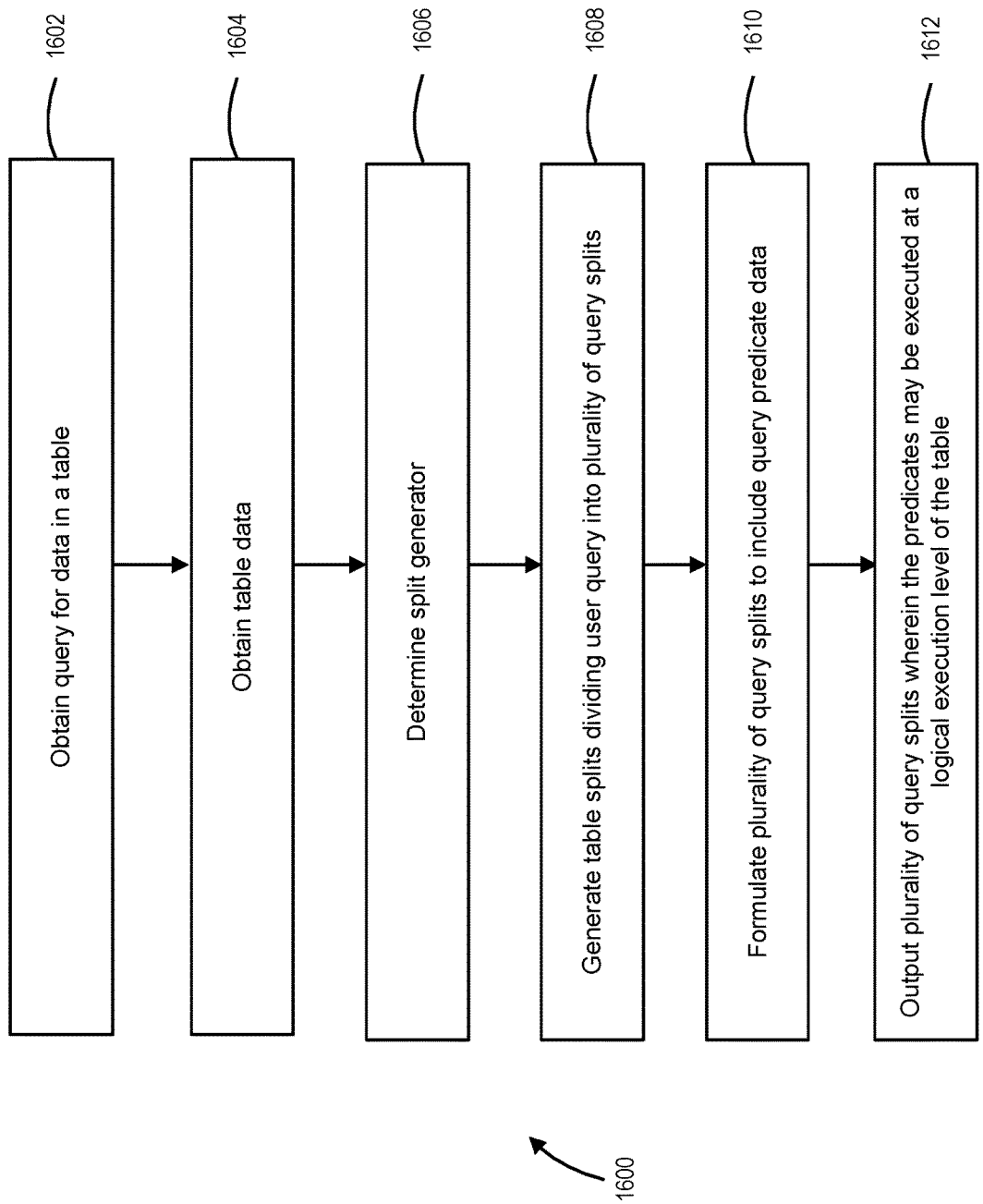
FIG. 16 is a flowchart that illustrates a method for providing query processing with table-level predicate pushdown in a data warehouse layer, in accordance with an embodiment.

FIG. 16 is a flowchart that illustrates a method 1600 for providing query processing with table-level predicate pushdown in a data warehouse layer, in accordance with an embodiment and with reference now to that Figure, a method 1600 is illustrated for split query processing with table level predicate pushdown in a massively parallel or other distributed database environment including a plurality of databases and a data warehouse layer providing data summarization and querying of the plurality of databases. The method at step 1602 obtains, from an associated client application, a query for data in a table of the data warehouse layer, the query comprising query data representative of a user query, query predicate data representative of one or more predicates of the user query, and user preference data representative of a user preference, wherein the one or more predicates of the user query comprise portions of the user query operative to filter data.

At step 1604 the method obtains table data representative of one or more properties of the table, at step 1606 determines a splits generator in accordance with one or more of the user preference or the one or more properties of the table, and at step 1608 generates, by the selected splits generator, table splits dividing the user query into a plurality of query splits.

At step 1610 the method formulates the plurality of query splits to include the query predicate data representative of the one or more predicates of the user query.

At step 1612 the method outputs the plurality of query splits to an associated plurality of mappers for execution by the associated plurality of mappers of each of the plurality of query splits against the table, wherein the one or more predicates of the user query may be executed at a logical execution level of the table.

Efficient Connection Management

A data processing task, e.g., a Hadoop task, is a unit of work submitted by a user to a data processing cluster, e.g., Hadoop, for processing. In accordance with an embodiment, query splits from a query are not executed atomically; instead, they are executed at different points in time. Each query split is equipped with a system change number (SCN) that make the reads from each query split consistent.

Each task processes a split of a large dataset generated by an input format component and each task uses a database connection for interacting with a database. Every time a new task is submitted for processing, a separate process, such as Java virtual machine process, can be created and a database connection is created. In a cluster with thousands of nodes, each of which can process hundreds of tasks, the number of database connections used can create a connection storm on the database.

In accordance with embodiments herein a system and method is provided for efficient connection management in a massively parallel or other distributed database environment including a plurality of databases and a data warehouse layer providing data summarization and querying of the plurality of databases. In accordance with an example embodiment, the method includes obtaining, from an associated client application, a query for data in a table of the data warehouse layer, the query comprising query data representative of a user query and user preference data representative of a user preference. The method further includes requesting a connection from a connection pool to obtain via the connection table data representative of one or more properties of the table, determining a splits generator in accordance with one or more of the user preference or the one or more properties of the table, and generating, by the selected splits generator, table splits dividing the user query into a plurality of query splits. The method further includes outputting the plurality of query splits to an associated plurality of mappers for execution using the connection by the associated plurality of mappers of each of the plurality of query splits against the table.

In accordance with an embodiment, described herein is a system and method for efficient connection management in a distributed parallel processing environment. In accordance with an embodiment, a pseudo connection pool of size one is created. The connection pool creates a connection when a connection is first requested by the database table accessor to create query splits, wherein the connection is used by various components, e.g., a record reader and a mapper, for processing a first split. When a connection is requested by a task that reuses the process that created for processing the first split, the same connection is returned for use from the connection pool when the connection credentials match. If the connection credentials do not match, the existing connection is closed, and a new connection is created and returned.

In accordance with an embodiment, a task reuse parameter can be used to enable a process to process a plurality of tasks, so that the plurality of tasks can reuse a same connection from the connection pool.

In accordance with an embodiment, the connection pool can cache a SQL statement so that query splits from a same query can reuse the SQL statement. In accordance with an embodiment, query splits from a same query include a same SQL statement with different binds. Caching the SQL statement can improve performance. For example, by caching executable statements used repeatedly, performance be can improved by preventing the overhead of repeated cursor creation, repeated statement parsing and creating, and by reusing data structures in the data warehouse layer.

Figure 17:
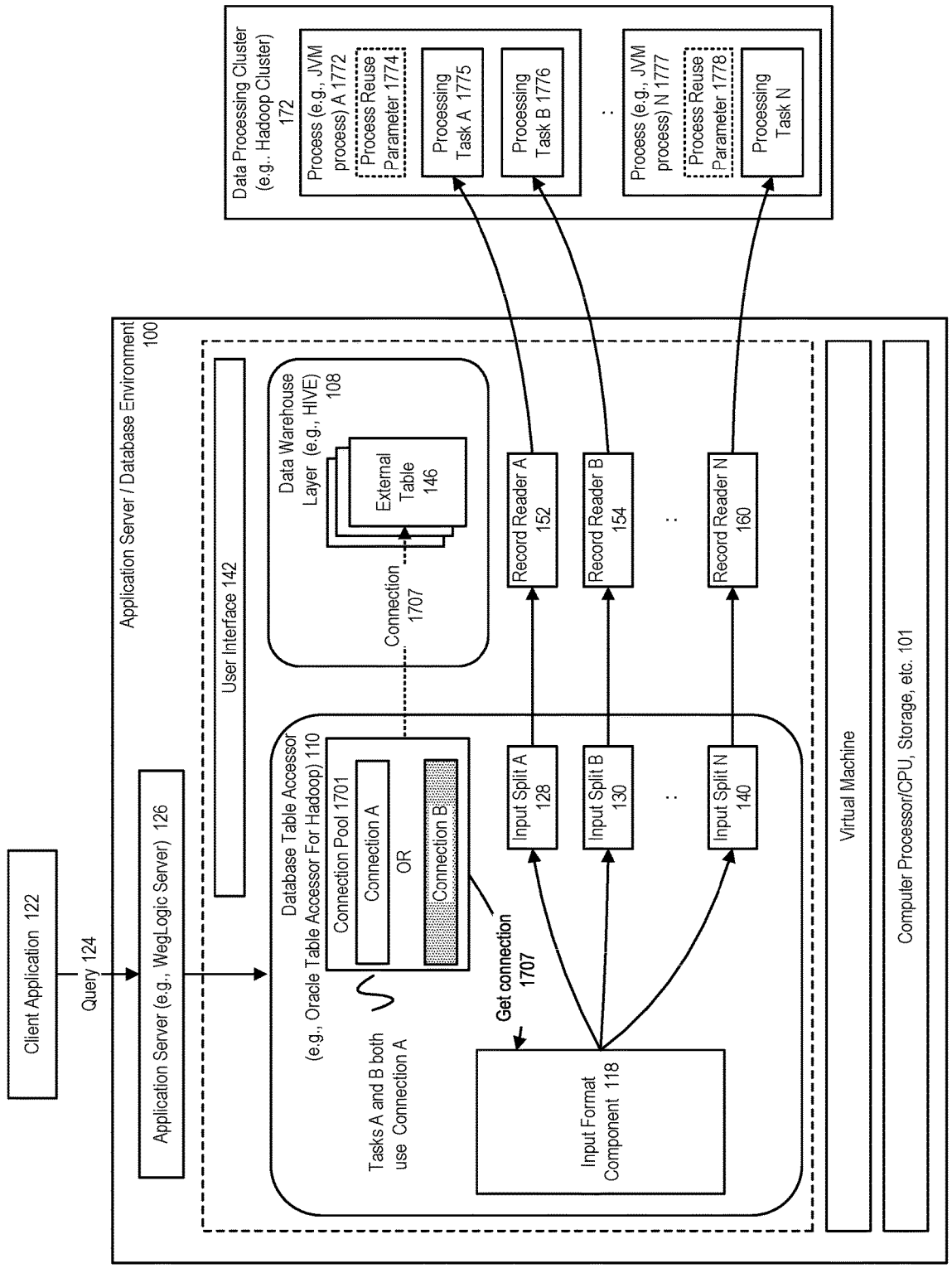
FIG. 17 illustrates a system for providing efficient connection management in a distributed database environment, in accordance with an embodiment.

FIG. 17 illustrates a system for efficient connection management in a distributed parallel processing environment, in accordance with an embodiment. As illustrated, the database table accessor includes a connection pool 1701 of size one and caches a single connection. The connection can be used to connect 1707 to a database table via the external table.

In accordance with an embodiment, when a query is received, the database table accessor can request a connection from the connection pool for retrieving user hints and table properties to generate query splits. The connection pool can create a connection 903 and returns the connection to the database table accessor. When a query split, e.g., Input Split A 128, is executed by a record reader, e.g., 152, against the external table, the same connection is used to retrieve table records for processing by the data processing cluster.

As further shown, the data processing cluster includes two processes (e.g., Java virtual machine processes) 1772 and 1777, and each process includes a process reuse parameter 1774 and 1778. In accordance with an embodiment, a process reuse parameter can be set by a processing task that spawns the process. If the value is 1 (the default), then a process with the value cannot be reused. A higher value than 1 can be specified via an application programming interface to enable the process to process more tasks. If the value is −1, there is no limit to the number of tasks the processes can run (of the same job). In accordance with an embodiment, the process reuse parameter, e.g., reuse.jvm.num.tasks, can be associated with the task that spawns the process, which can automatically inherit the value of the parameter.

As illustrated by FIG. 17, Tasks A 1775 and B 1776 use the same process. In accordance with an embodiment, which tasks share a certain process can be determined by the data processing cluster. In accordance with an embodiment, Task B, which is spawn to process input split B 130, can request a connection from the connection pool. If the connection credentials match, the existing connection is returned for use by the record reader B 154 and the processing task B. As such, the connection in the connection pool can be shared between tasks and among various components within a task. In accordance with an embodiment, if the connection credentials do not match, the existing connection is closed and a new connection 905 can be created and returned.

In accordance with an embodiment, the connection pool of size one can provide a connection to be reused by a next task that reuses the same process in the data processing cluster. In addition, this approach for sharing database resources across multiple tasks in a distributed system can provide additional benefits such as performance enhancing persistence between tasks, when compared with alternative ways to control the number of connections, e.g., by using a proxy or a wallet manager.

Figure 18:
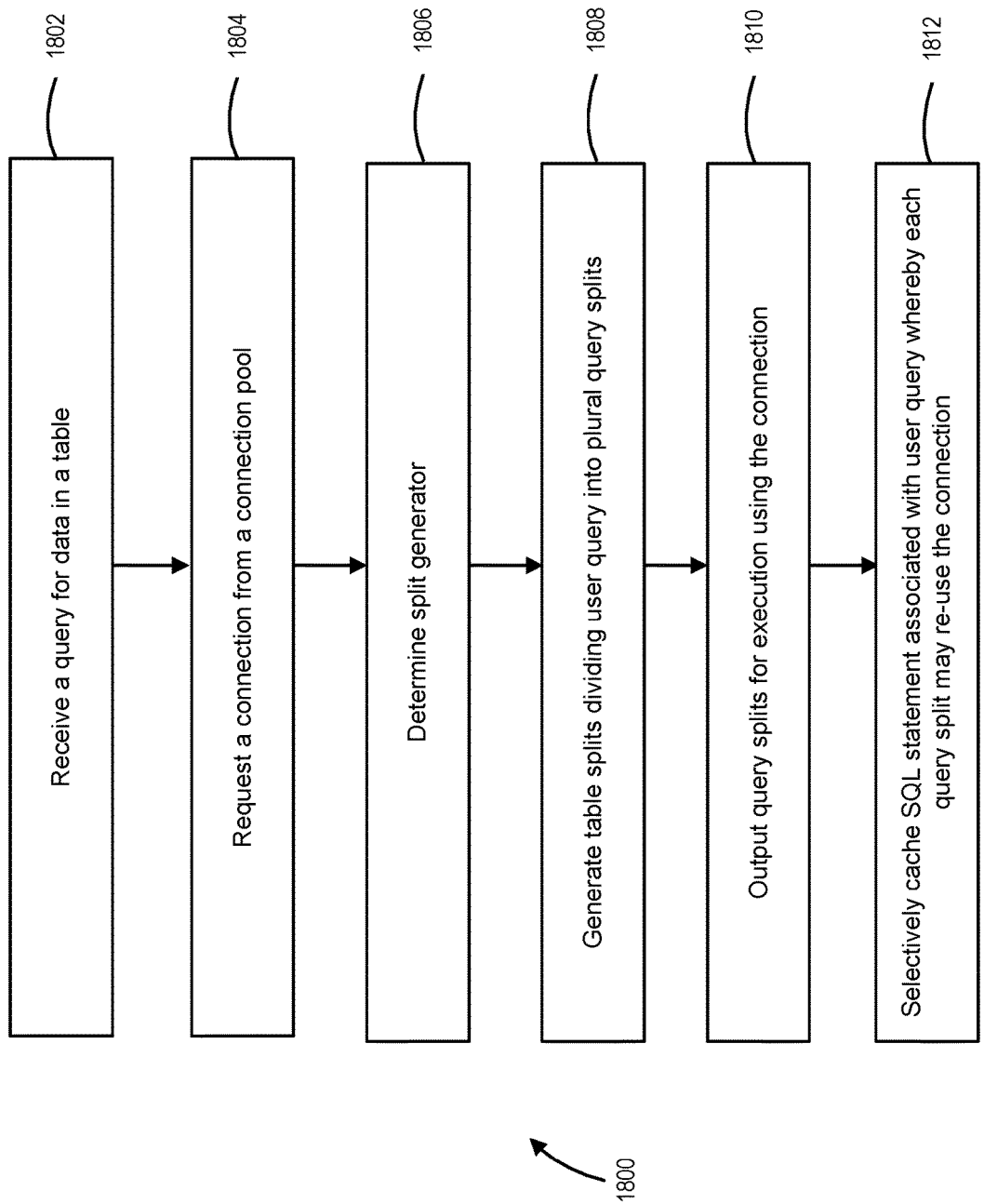
FIG. 18 is a flowchart that illustrates a method for providing efficient connection management in a distributed database environment, in accordance with an embodiment.

FIG. 18 is a flowchart that illustrates a method 1800 for providing efficient connection management in a distributed database environment, in accordance with an embodiment and, with reference now to that Figure, a method 1800 is provided for efficient connection management in a massively parallel or other distributed database environment including a plurality of databases and a data warehouse layer providing data summarization and querying of the plurality of databases. The method at step 1802 obtains, from an associated client application, a query for data in a table of the data warehouse layer, the query comprising query data representative of a user query and user preference data representative of a user preference.

At step 1804 the method requests a connection from a connection pool to obtain via the connection table data representative of one or more properties of the table, and at step 1806 determines a splits generator in accordance with one or more of the user preference or the one or more properties of the table.

At step 1808 the method generates, by the selected splits generator, table splits dividing the user query into a plurality of query splits.

At step 1810 the method outputs the plurality of query splits to an associated plurality of mappers for execution using the connection by the associated plurality of mappers of each of the plurality of query splits against the table.

In accordance with a further embodiment, the method is operative at step 1812, to cache a structured query language (SQL) statement associated with the user query in the connection pool whereby each of the plurality of query splits generated by splits dividing the user query into the plurality of query splits can selectively reuse the connection and the SQL statement.

Embodiments herein may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the embodiment includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments have been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for database split generation in a database access environment including a plurality of databases and a data warehouse layer executing on one or more microprocessors, the method comprising:
    receiving by a database table accessor executing on the one or more microprocessors, from a client application, a query for data in a table of the data warehouse layer;
    obtaining a metadata representative of the table containing the data;
    determining a splits generator based at least partly on the obtained metadata;
    generating, by the splits generator, a plurality of query splits, wherein each of the plurality of query splits is executable by a corresponding associated mapper of a plurality of associated mappers against the table; and
    generating a response to the query based on received results of each of the plurality of query splits executed against the table.

2. The method of claim 1, wherein the determining the splits generator comprises selecting the splits generator from among a plurality of splitter kinds in accordance with a user preference or one or more properties of the table.

3. The method of claim 2, wherein the determining the splits generator comprises selecting the splits generator for splitting the table based on one or more of partitions, sizes, row limits, and/or ROWID ranges.

4. The method of claim 2, wherein the determining the splits generator comprises determining the splits generator exclusively in accordance with:
    the user preference, or
    the one or more properties of the table.

5. The method of claim 1, wherein the obtaining the metadata comprises obtaining metadata representative of the one or more properties of the table.

6. The method of claim 1, further comprising:
    executing each of the plurality of query splits against the table using a corresponding associated mapper of the plurality of associated mappers.

7. The method of claim 1, further comprising:
    outputting the plurality of query splits for execution against the table by the corresponding associated mappers of the plurality of mappers;
    receiving results of each of the plurality of query splits executed against the table using the corresponding associated mappers of the plurality of mappers; and
    generating the response based on the received results of each of the plurality of query splits executed against the table using the corresponding associated mappers of the plurality of mappers.

8. The method of claim 1, wherein:
obtaining metadata comprises obtaining table data representative of one or more properties of the table from a metadata store, wherein the table data comprises one or more of:
partition data representative of a partition scheme of the table as having a partitioned topology wherein the table is logically divided into one or more partitions or an un-partitioned topology wherein the table is logically undivided; and/or
files, data blocks, and row numbers for the table in accordance with the user query for blocks of data in the table.

9. A system for database split generation in a database access environment including a plurality of databases and a data warehouse layer executing on one or more microprocessors, the system comprising:
one or more microprocessors; and
a database table accessor executing on the one or more microprocessors and being configured to perform a method of database split generation comprising:
receiving by a database table accessor executing on the one or more microprocessors, from a client application, a query for data in a table of the data warehouse layer;
obtaining a metadata representative of the table containing the data;
determining a splits generator based at least partly on the obtained metadata;
generating, by the splits generator, a plurality of query splits, wherein each of the plurality of query splits is executable by a corresponding associated mapper of a plurality of associated mappers against the table; and
generating a response to the query based on received results of each of the plurality of query splits executed against the table.

10. The system of claim 9, wherein the determining the splits generator comprises selecting the splits generator from among a plurality of splitter kinds in accordance with a user preference or one or more properties of the table.

11. The system of claim 10, wherein the determining the splits generator comprises selecting the splits generator for splitting the table based on one or more of partitions, sizes, row limits, and/or ROWID ranges.

12. The system of claim 10, wherein the determining the splits generator comprises determining the splits generator exclusively in accordance with:
the user preference, or
the one or more properties of the table.

13. The system of claim 9, wherein the obtaining the metadata comprises obtaining metadata representative of the one or more properties of the table.

14. The system of claim 9, further comprising:
executing each of the plurality of query splits against the table using a corresponding associated mapper of the plurality of associated mappers.

15. The system of claim 9, further comprising:
outputting the plurality of query splits for execution against the table by the corresponding associated mappers of the plurality of mappers;
receiving results of each of the plurality of query splits executed against the table using the corresponding associated mappers of the plurality of mappers; and
generating the response based on the received results of each of the plurality of query splits executed_against the table using the corresponding associated mappers of the plurality of mappers.

16. The system of claim 9, wherein:
obtaining metadata comprises obtaining table data representative of one or more properties of the table from a metadata store, wherein the table data comprises one or more of:
partition data representative of a partition scheme of the table as having a partitioned topology wherein the table is logically divided into one or more partitions or an un-partitioned topology wherein the table is logically undivided; and/or
files, data blocks, and row numbers for the table in accordance with the user query for blocks of data in the table.

17. A non-transitory computer readable storage medium, including instructions stored thereon which when read and executed by one or more computers, cause the one or more computers to perform a method of database split generation comprising:
receiving_by a database table accessor executing on the one or more microprocessors, from a client application, a query for data in a table of the data warehouse layer;
obtaining a metadata representative of the table containing the data;
determining a splits generator based at least partly on the obtained metadata;
generating, by the splits generator, a plurality of query splits, wherein each of the plurality of query splits is executable by a corresponding associated mapper of a plurality of associated mappers against the table; and
generating a response to the query based on received results of each of the plurality of query splits executed against the table.

18. The non-transitory computer readable storage medium of claim 17, wherein the determining the splits generator comprises selecting the splits generator from among a plurality of splitter kinds in accordance with a user preference or one or more properties of the table.

19. The non-transitory computer readable storage medium of claim 17, further comprising:
executing each of the plurality of query splits against the table using a corresponding associated mapper of the plurality of associated mappers.

20. The non-transitory computer readable storage medium of claim 17, further comprising:
outputting the plurality of query splits for execution against the table by the corresponding associated mappers of the plurality of mappers;
receiving results of each of the plurality of query splits executed against the table using the corresponding associated mappers of the plurality of mappers; and
generating the response based on the received results of each of the plurality of query splits executed against the table using the corresponding associated mappers of the plurality of mappers.

* * * * *

UNITED STATES PATENT AND TRADEMARK OFFICE
CERTIFICATE OF CORRECTION

| | | |
|---|---|---|
| PATENT NO. | : 12,248,476 B2 | Page 1 of 1 |
| APPLICATION NO. | : 18/400568 | |
| DATED | : March 11, 2025 | |
| INVENTOR(S) | : Shivarudraiah | |

It is certified that error appears in the above-identified patent and that said Letters Patent is hereby corrected as shown below:

In the Specification

In Column 6, Line 7, delete "properties" and insert -- properties. --, therefor.

In Column 7, Line 19, delete "in in" and insert -- in --, therefor.

In Column 7, Line 48, delete "PartionedSplitsGenerator;" and insert -- PartitionedSplitsGenerator; --, therefor.

In Column 24, Line 33, delete "sa1es" and insert -- sales --, therefor.

In Column 24, Line 43, delete "input.guery'" and insert -- input.query' --, therefor.

In the Claims

In Column 29, Line 15, in Claim 9, delete "for database split generationin" and insert -- in --, therefor.

In Column 30, Line 5, in Claim 15, delete "executed_against" and insert -- executed against --, therefor.

In Column 30, Line 25, in Claim 17, delete "receiving_by" and insert -- receiving by --, therefor.

Signed and Sealed this
Third Day of June, 2025

Coke Morgan Stewart
*Acting Director of the United States Patent and Trademark Office*